US012130879B2

(12) United States Patent
Shah et al.

(10) Patent No.: US 12,130,879 B2
(45) Date of Patent: Oct. 29, 2024

(54) TWO-STAGE SELECTION OF LOCAL INFORMATION ITEMS

(71) Applicant: Microsoft Technology Licensing, LLC, Redmond, WA (US)

(72) Inventors: Deven Santosh Shah, Sunnyvale, CA (US); Shiying He, Jersey City, NJ (US); Gosuddin Kamaruddin Siddiqi, Redmond, WA (US); Radhika Bansal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/130,386

(22) Filed: Apr. 3, 2023

(65) Prior Publication Data
US 2024/0330384 A1 Oct. 3, 2024

(51) Int. Cl.
*G06F 7/00* (2006.01)
*G06F 16/00* (2019.01)
(Continued)

(52) U.S. Cl.
CPC ...... *G06F 16/9537* (2019.01); *G06F 16/9535* (2019.01)

(58) Field of Classification Search
None
See application file for complete search history.

(56) References Cited

U.S. PATENT DOCUMENTS 8,010,482 B2 8/2011 Andersen et al.
9,183,258 B1 11/2015 Taylor et al.
(Continued)

FOREIGN PATENT DOCUMENTS

CN 112052707 A 12/2020
WO 2022211730 A1 10/2022

OTHER PUBLICATIONS

Shah, et al., "Local Life: Stay Informed Around You, A Scalable Geoparsing and Geotagging Approach to Serve Local News Worldwide," arXiv, arXiv:2305.07168v1 [cs.IR], May 11, 2023, 7 pages.
(Continued)

*Primary Examiner* — Tuan A Pham

(57) ABSTRACT

A technique selects and serves local information items (e.g., news articles) to users. In a first stage, the technique uses a machine-trained localness-determining system to determine whether a candidate information item contains the kind of information that qualifies as locally-themed. In a second stage, a scope-determining system determines a particular geographic region associated with the information item. The technique then selectively serves the information item to a particular consumer upon determining that the particular consumer is located in the particular geographic region associated with the item. In some implementations, the scope-determining system describes the particular geographic region of the information item using a set of geohashes, and describes the location of the consumer using at least one geohash. The technique uses an ensemble approach to identify the particular geographic region of the item, and to generate training examples for use in training the localness-determining system.

20 Claims, 15 Drawing Sheets

(51) Int. Cl.
*G06F 16/9535* (2019.01)
*G06F 16/9537* (2019.01)

(56) References Cited

U.S. PATENT DOCUMENTS

| | | | |
|---|---|---|---|
| 9,507,819 B2 | 11/2016 | Gross | |
| 2008/0243906 A1* | 10/2008 | Peters | G06F 16/9577 |
| | | | 707/999.102 |
| 2016/0110810 A1 | 4/2016 | Ashok et al. | |
| 2017/0109506 A1* | 4/2017 | Shetty | G06F 16/13 |
| 2019/0349320 A1 | 11/2019 | Karuppusamy et al. | |
| 2021/0279852 A1* | 9/2021 | Jakka | G06F 16/29 |

OTHER PUBLICATIONS

Adar, et al., "PersaLog: Personalization of News Article Content," in CHI '17: Proceedings of the 2017 CHI Conference on Human Factors in Computing Systems, May 2017, pp. 3188-3200.

Alt, et al., "Location-based Crowdsourcing: Extending Crowdsourcing to the Real World," in NordiCHI '10: Proceedings of the 6th Nordic Conference on Human-Computer Interaction: Extending Boundaries, Oct. 2010, pp. 13-22.

Bell, et al., "A system for automatic broadcast news summarization, geolocation and translation," in Sixteenth Annual Conference of the International Speech Communication Association, 2015, 2 pages.

Gonalves, et al., "Local News and Geolocation Technology in the Case of Portugal," Publications, vol. 9, No. 53, 2021, 13 pages.

Middleton, et al., "Location Extraction from Social Media: Geoparsing, Location Disambiguation, and Geotagging," in ACM Transactions on Information Systems, vol. 36, Issue 4, Article No. 40, pp. 1-27.

Robindro, et al., "An Unsupervised Content Based News Personalization Using Geolocation Information," in 2017 International Conference on Computing, Communication and Automation (ICCCA), 2017, pp. 128-132.

Sankaranarayanan, et al., "TwitterStand: News in Tweets," in GIS '09: Proceedings of the 17th ACM Sigspatial International Conference on Advances in Geographic Information Systems, Nov. 2009, pp. 42-51.

Shah, et al., "Distantly Supervised Semantic Text Detection and Recognition for Broadcast Sports Videos Understanding," in MM '21: Proceedings of the 29th ACM International Conference on Multimedia, Oct. 2021, pp. 1167-1175.

Shah, et al., "Predictive Biases in Natural Language Processing Models: A Conceptual Framework and Overview," arXiv, Cornell University, arXiv:1912.11078v2 [cs.CL], Sep. 12, 2020, 17 pages.

Tahmasebzadeh, et al., "GeoWINE: Geolocation based Wiki, Image, News and Event Retrieval," in SIGIR '21: Proceedings of the 44th International ACM SIGIR Conference on Research and Development in Information Retrieval, Jul. 2021, pp. 2565-2569.

Teitler, et al., "NewsStand: A New View on News," in GIS '08: Proceedings of the 16th ACM Sigspatial International Conference on Advances in Geographic Information Systems, Article No. 18, Nov. 2008, 10 pages.

Väätäjä, et al., "Location-Based Crowdsourcing of Hyperlocal News: Dimensions of Participation Preferences," in Group '12: Proceedings of the 2012 ACM International Conference on Supporting Group Work, Oct. 2012, pp. 85-94.

Brown, et al., "Language Models are Few-Shot Learners," in 34th Conference on Neural Information Processing Systems (NeurIPS 2020), 2020, 25 pages.

Conneau, et al., "Unsupervised Cross-lingual Representation Learning at Scale," arXiv, Cornell University, arXiv:1911.02116v2 [cs.CL], Apr. 8, 2020, 12 pages.

Kliman-Silver, et al., "Location, Location, Location: The Impact of Geolocation on Web Search Personalization," in IMC '15: Proceedings of the 2015 Internet Measurement Conference, Oct. 2015, pp. 121-127.

Manning, et al., "The Stanford CoreNLP Natural Language Processing Toolkit," in Proceedings of 52nd Annual Meeting of the Association for Computational Linguistics: System Demonstrations, Jun. 2014, pp. 55-60.

Google translation of CN112052707A, available at https://patents.google.com/patent/CN112052707A/en?oq=cn112052707, accessed on Mar. 10, 2023, 17 pages.

Espacenet abstract for CN112052707A, available at https://worldwide.espacenet.com/patent/search/family/073608714/publication/CN112052707A?q=pn%3DCN112052707A, accessed on Mar. 10, 2023, 1 page.

Iiin, Ivan, "Building a news aggregator from scratch: news filtering, classification, grouping in threads and ranking," available at https://towardsdatascience.com/building-a-news-aggregator-from-scratch-news-filtering-classification-grouping-in-threads-and-7b0bbf619b68, Towards Data Science, Jan. 27, 2020, 10 pages.

"Find a Location by Query," available at https://learn.microsoft.com/en-us/bingmaps/rest-services/locations/find-a-location-by-query, Microsoft Corporation, Documentation, Jul. 20, 2022, 15 pages.

"Bing Maps Support," available at https://www.microsoft.com/en-us/maps/support, Bing Maps support website, Microsoft Corporation, accessed Mar. 11, 2023, 4 pages.

"Geohash," available at https://en.wikipedia.org/wiki/Geohash, Wikipedia article, accessed on Mar. 1, 2023, 10 pages.

Ample, et al., "Cross-lingual Language Model Pretraining," arXiv, Cornell University, arXiv:1901.07291v1 [cs.CL], Jan. 22, 2019, 10 pages.

Devlin, et al., "BERT: Pre-training of Deep Bidirectional Transformers for Language Understanding," arXiv, Cornell University, arXiv:1810.04805v2 [cs.CL], May 24, 2019, 16 pages.

Vaswani, et al., "Attention Is All You Need," arXiv, Cornell University, arXiv:1706.03762v5 [cs.CL], Dec. 6, 2017, 15 pages.

Hu, et al., "Location reference recognition from texts: A survey and comparison," arXiv, Cornell University, arXiv:2207.01683v1 [cs.CL], Jul. 4, 2022, 35 pages.

"Topic model," available at https://en.wikipedia.org/wiki/Topic_model, Wikipedia article, accessed on Mar. 11, 2023, 7 pages.

"Text Search," available at https://developers.google.com/maps/documentation/places/web-service/search-text, Google Maps Platform, accessed on Mar. 11, 2023, 26 pages.

Zhao, et al., "Topic Modelling Meets Deep Neural Networks: A Survey," arXiv, Cornell University, arXiv:2103.00498v1 [cs.LG], Feb. 28, 2021, 8 pages.

Dong, Yue, "A Survey on Neural Network-Based Summarization Methods," arXiv, Cornell University, arXiv:1804.04589v1 [cs.CL], Mar. 19, 2018, 16 pages.

"Nominatim," available at https://wiki.openstreetmap.org/wiki/Nominatim, Wikipedia article, accessed on Mar. 12, 2023, 3 pages.

Jelodar, et al., "Latent Dirichlet Allocation (LDA) and Topic modeling: models, applications, a survey," arXiv, Cornell University, arXiv:1711.04305v2 [cs.IR], Dec. 6, 2018, 40 pages.

Shah, et al., "What's happening in your neighborhood? A Weakly Supervised Approach to Detect Local News," arXiv, Cornell University, arXiv:2301.08146v1 [cs.IR], Jan. 15, 2023, 8 pages.

\* cited by examiner

OVERVIEW OF OPERATION OF THE THIRD REGION-IDENTIFYING COMPONENT, 1202

COLLECT A SET OF INFORMATION ITEMS ASSOCIATED WITH A PARTICULAR PUBLISHER.
1204

INTERACT WITH A REFERENCE SYSTEM TO DETERMINE A FIRST SUBSET OF CANDIDATE REGIONS ASSOCIATED WITH THE PARTICULAR PUBLISHER.
1206

GENERATE A DISTRIBUTION OF CANDIDATE REGIONS IN THE FIRST SUBSET OF CANDIDATE REGIONS, THE DISTRIBUTION EXPRESSING A FREQUENCY AT WHICH EACH CANDIDATE REGION IN THE FIRST SUBSET OF CANDIDATE REGIONS APPEARS IN THE FIRST SUBSET OF CANDIDATE REGIONS.
1208

BASED ON THE DISTRIBUTION, IDENTIFY AND REMOVE A PARTICULAR REGION FROM THE FIRST SUBSET OF CANDIDATE REGIONS THAT SATISFIES A PRESCRIBED TEST FOR REMOVAL, TO PRODUCE A FINAL SUBSET OF REGIONS.
1210

FIG. 12

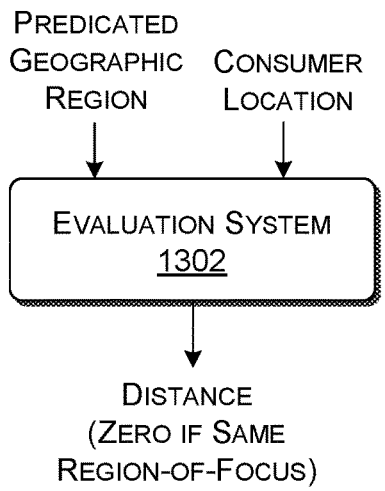

FIG. 13

APPLICATION SYSTEMS 130

- SEARCH RESULT FILTERING COMPONENT 1402
- RECOMMENDING COMPONENT 1404
- NEWSFEED-SERVING COMPONENT 1406
- ALERTING COMPONENT 1408
- TREND-ASSESSING COMPONENT 1410
- ETC.

FIG. 14

OVERVIEW OF OPERATION OF THE FIRST EXAMPLE-MINING SYSTEM, 1702

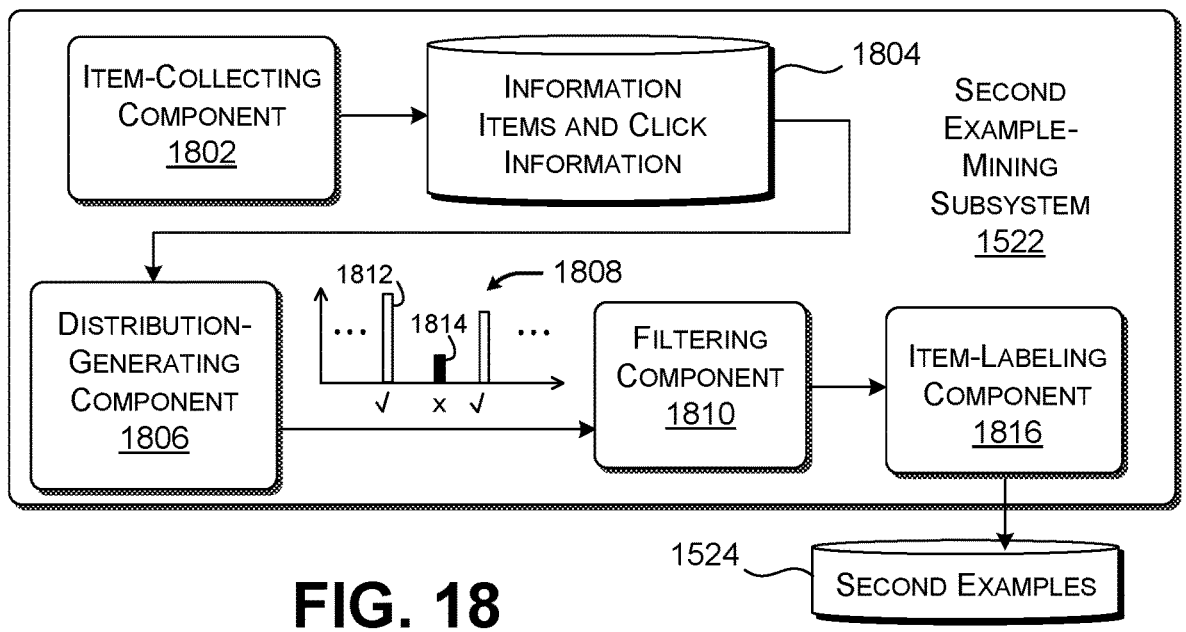

FIG. 18

OVERVIEW OF OPERATION OF THE SECOND EXAMPLE-MINING SYSTEM, 1902

COLLECT INFORMATION REGARDING INFORMATION ITEMS PUBLISHED BY A PARTICULAR PUBLISHER WITHIN A PRESCRIBED TIMEFRAME, AND ENGAGEMENT BY USERS WITH THE INFORMATION ITEMS PUBLISHED BY THE PARTICULAR PUBLISHER. 1904

GENERATE A DISTRIBUTION BASED ON THE INFORMATION THAT IS COLLECTED, THE DISTRIBUTION EXPRESSING A FREQUENCY AT WHICH INFORMATION ITEMS ARE SELECTED WITH RESPECT TO DIFFERENT LOCATIONS-OF-INTEREST. 1906

IDENTIFY AND REMOVE A PARTICULAR LOCATION-OF-INTEREST FROM THE DISTRIBUTION UPON DETERMINING THAT THE PARTICULAR LOCATION-OF-INTEREST HAS A FREQUENCY-OF-SELECTION THAT IS LESS THAN A LOCATION-OF-INTEREST HAVING A MAXIMUM FREQUENCY-OF-SELECTION IN THE DISTRIBUTION, BY A PRESCRIBED NORMALIZED AMOUNT. 1908

BASED ON AN OUTCOME OF BLOCK 1908, CLASSIFY AN EXTENT TO WHICH THE PARTICULAR PUBLISHER IS A LOCAL PUBLISHER, AND FOR A PUBLISHER THAT IS IDENTIFIED AS A LOCAL PUBLISHER, IDENTIFY INFORMATION ITEMS PUBLISHED BY THIS LOCAL PUBLISHER AS LOCAL INFORMATION ITEMS. 1910

FIG. 19

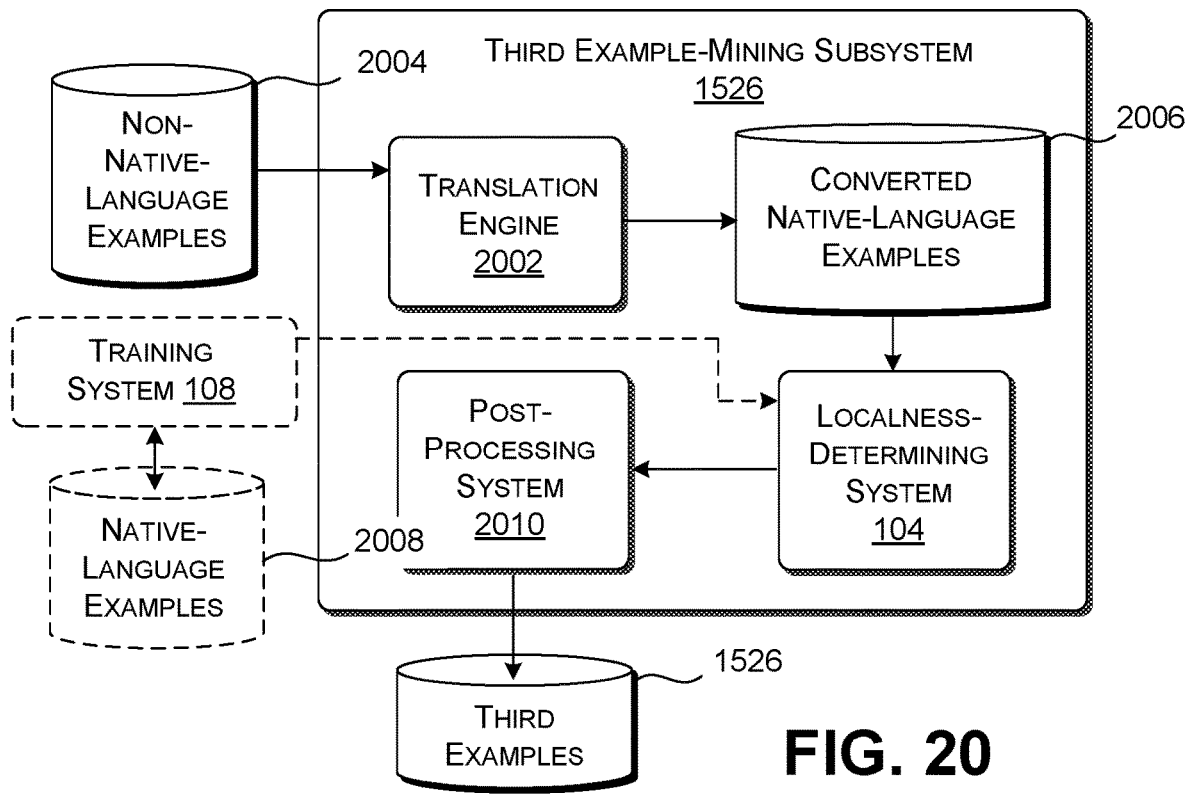

FIG. 20

OVERVIEW OF OPERATION OF THE THIRD EXAMPLE-MINING SUBSYSTEM, 2102

TRANSLATE A PARTICULAR INFORMATION ITEM FROM A FIRST NATURAL LANGUAGE TO A SECOND NATURAL LANGUAGE, TO PROVIDE A CONVERTED INFORMATION ITEM.
2104

DETERMINE, USING THE LOCALNESS-DETERMINING SYSTEM, WHETHER THE CONVERTED INFORMATION ITEM CONTAINS LOCAL CONTENT, THE LOCALNESS-DETERMINING SYSTEM BEING TRAINED BASED ON TRAINING EXAMPLES EXPRESSED IN THE SECOND NATURAL LANGUAGE.
2106

PRODUCE A TRAINING EXAMPLE BASED ON THE CONVERTED INFORMATION ITEM.
2108

FIG. 21

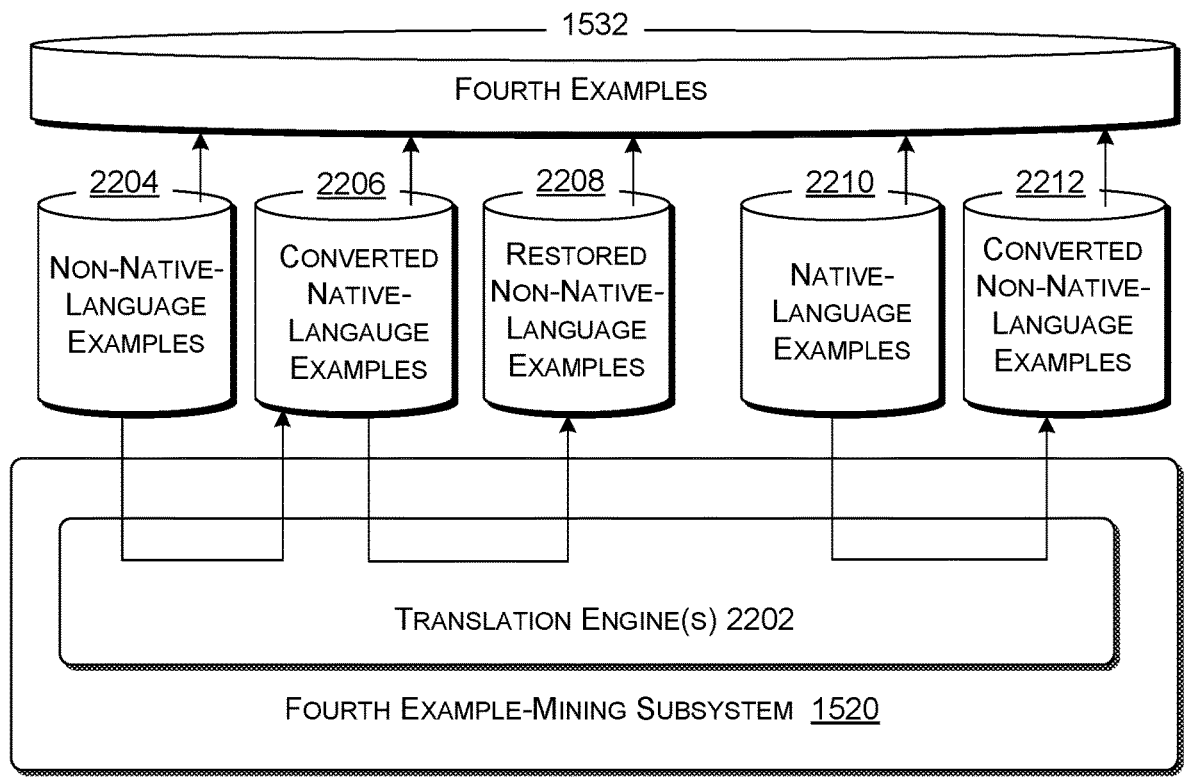

FIG. 22

OVERVIEW OF OPERATION OF THE FOURTH EXAMPLE-MINING SYSTEM, 2302

(1) TRANSLATE A FIRST PARTICULAR INFORMATION ITEM FROM A FIRST NATURAL LANGUAGE TO A SECOND NATURAL LANGUAGE, TO PRODUCE A CONVERTED INFORMATION ITEM, AND THEN TRANSLATE THE CONVERTED INFORMATION ITEM FROM THE SECOND NATURAL LANGUAGE TO THE FIRST NATURAL LANGUAGE, TO PROVIDE A RESTORED INFORMATION ITEM; AND (2) PRODUCE A FIRST TRAINING EXAMPLE BASED ON THE RESTORED INFORMATION ITEM. 2304

(1) TRANSLATE A SECOND PARTICULAR INFORMATION ITEM FROM THE SECOND NATURAL LANGUAGE TO THE FIRST NATURAL LANGUAGE TO PRODUCE A TRANSLATED INFORMATION ITEM; AND (2) PRODUCE A SECOND TRAINING EXAMPLE BASED ON THE TRANSLATED INFORMATION ITEM. 2306

FIG. 23

TWO-STAGE SELECTION OF LOCAL INFORMATION ITEMS

BACKGROUND

Serving appropriate locally-themed content to users is a technically challenging task. Some previous systems serve a news article to local users if that article mentions a local entity. Common local entities include the names of cities, local establishments, local landmarks, etc. This approach may fail because a news article that mentions a local entity may be of broad interest to many users, including non-local users. Alternatively, or in addition, a news article may not mention any local entities, yet it remains of local interest. In yet other cases, a news article may refer to local entities, yet do so without explicitly specifying the canonical names of those entities. Further compounding the complexity of the above classification task is the fact that a classification system developed for one part of the world may perform poorly when applied to a different part of the world, due to differences in languages, norms, etc. Despite the above challenges, assume that a system correctly identifies a news article as having content of local interest. The system may still provide substandard performance because it fails to deliver the news article to appropriate recipients.

The shortcomings of previous systems prevent a user from receiving relevant information items. In certain cases, this failure can lead to the inability to react in a timely manner to a local event, imperiling the safety of a user. In addition, or alternatively, previous systems may clutter a user's information feed with non-relevant news articles. These drawbacks impede the user's efficient interaction with computing functionality, and also lead to the inefficient consumption of computer-related resources (memory resources, processor resources, bandwidth-related resources, etc.).

SUMMARY

According to some implementations, a technique is described herein for selecting and serving local information items (e.g., news articles) to a user in two stages. In the first stage, the technique uses a machine-trained localness-determining system to determine whether a candidate information item contains local content. Local content is content that matches a kind of information known to be selectively consumed within geographic regions of limited geographic scope, and selectively ignored outside of those regions. In the second stage, upon determining that the information item contains local content, a scope-determining system determines a particular geographic region associated with the information item, specifying both the location and bounds of that region. This region is referred to below for brevity as the "item region." The technique then identifies a region at which a particular consumer is located, referred to below as the "consumer region." The technique serves the information item to the consumer upon determining that the consumer region matches at least part of the item region.

According to illustrative aspects, the technique uses a set of geohashes to describe the item region. The technique uses at least one geohash to describe the consumer region.

According to illustrative aspects, the scope-determining system operates by: using an ensemble of region-identifying processes to identify a set of candidate regions; and identifying the item region by choosing from among the set of candidate regions, based on rule information.

According to illustrative aspects, the localness-determining system is produced by a training system based on a set of training examples. A mining system uses an ensemble of example-mining processes to produce the training examples. Training performed on these training examples constitutes a form of weakly-supervised learning.

Accordingly to illustrative aspects, the technique addresses at least the above-noted problems by intelligently providing information items to users that are most likely to contain locally-themed content.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 12 shows a process that describes one manner of operation of the third region-identifying component of FIG. 11.

FIG. 13 shows an evaluation system for evaluating the accuracy of the computing system of FIG. 1.

FIG. 14 shows various application components that can leverage the computing system of FIG. 1.

FIG. 18 shows a second example-mining subsystem of the example-mining system of FIG. 15.

FIG. 19 shows a process that describes one manner of operation of the second example-mining subsystem of FIG. 18.

FIG. 20 shows a third example-mining subsystem of the example-mining system of FIG. 15.

FIG. 21 shows a process that describes one manner of operation of the third example-mining subsystem of FIG. 20.

FIG. 22 shows a fourth example-mining subsystem of the example-mining system of FIG. 15.

FIG. 23 shows a process that describes one manner of operation of the fourth example-mining subsystem of FIG. 22.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

Figure 1:
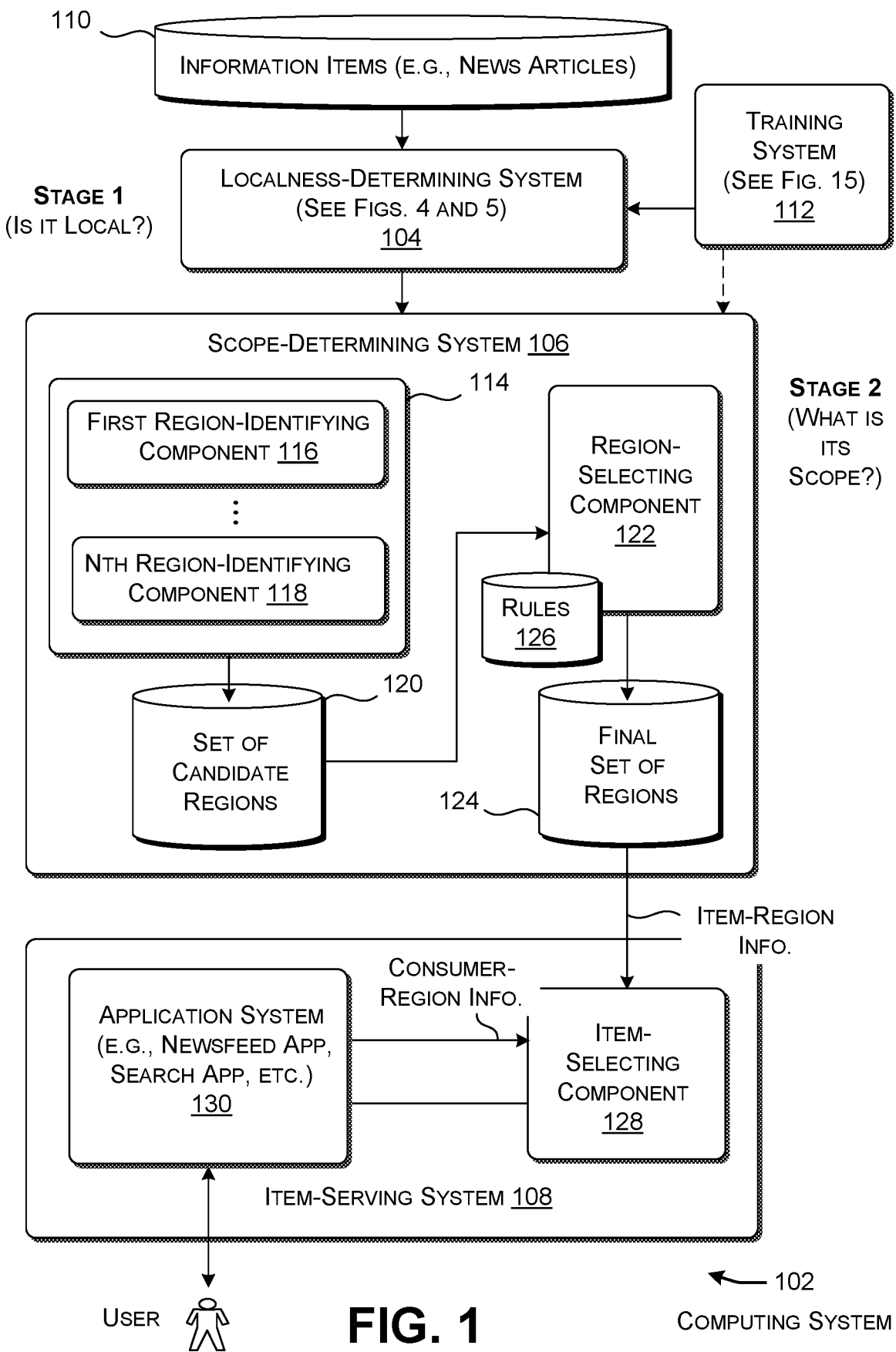
FIG. 1 shows a computing system for identifying and selectively serving information items (e.g., news articles) of local geographic interest.

FIG. 1 shows a computing system 102 that is dedicated to the task of selectively serving information items of local interest to appropriate users. An information item refers to any content that is consumable by a user via computing functionality, and includes any combination of text, images, graphics, video, audio content, etc. Common examples of local items include news articles, documents, postings, messages, notices, alerts, events, etc. An information item is said to have a local geographic interest when there is a prescribed probability that it will be selectively consumed by users of a particular geographic region having a limited and defined geographic scope, and selectively ignored by users outside this geographic region. In other words, a local information item's consumption pattern has a defined geographic focus. For instance, a news article about a class being held in John McLaren Park in the city of San Francisco, California is likely of local interest, because it pertains to a topic that may be of interest to those who live near the park, but not those who live in, for example, Los Angeles or Chicago or New York, or perhaps even San Jose (which is a city in California near the city of San Francisco). It remains a technically challenging task, however, to automatically assess the "localness" of an information item. For instance, an article about the historic meeting of diplomats in John McLaren Park may be of worldwide interest, as would the capture of a notorious criminal in John McLaren Park. Similarly, an article about the Golden Gate Bridge in San Francisco might be of national interest because it is a world-famous landmark.

Figure 3:
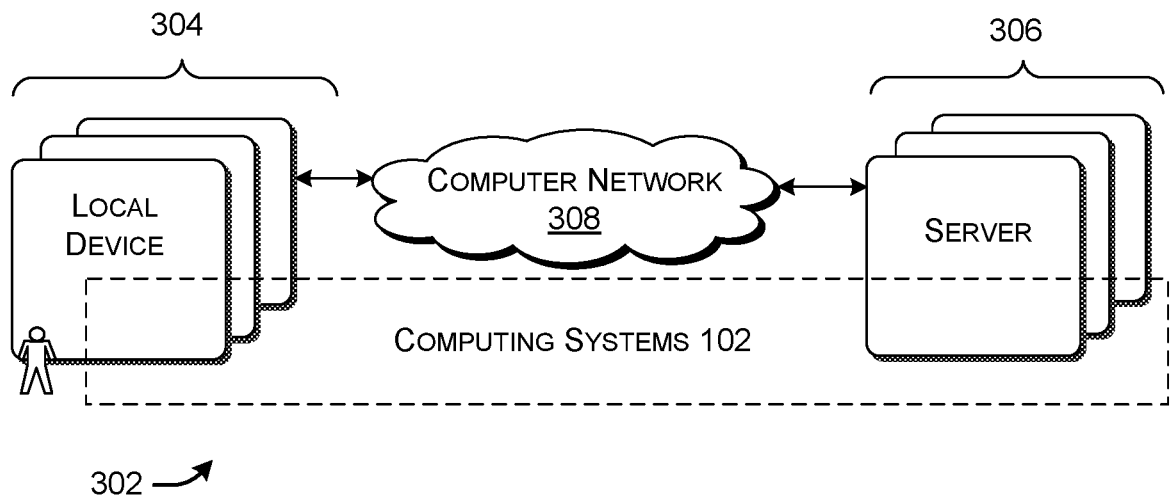
FIG. 3 shows illustrative computing equipment that is capable of implementing the computing system of FIG. 1.
Figure 25:
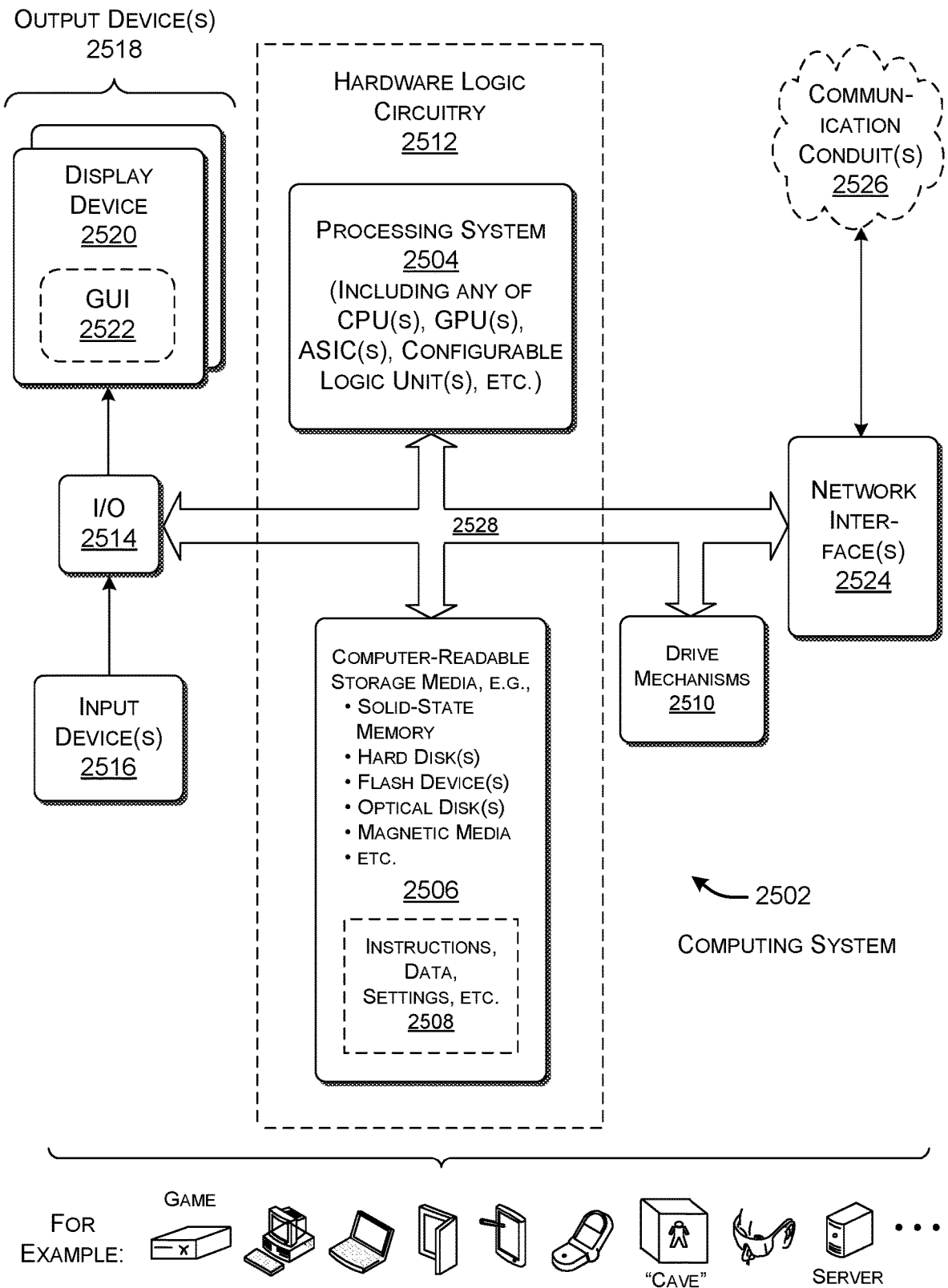
FIG. 25 shows an illustrative type of computing system that, in some implementations, is used to implement any aspect of the features shown in the foregoing drawings.

As to terminology, to facilitate explanation, an article that meets the above criterion of localness is referred to a "local information item" having "local content." The "geographic scope" of a local region refers to the location and bounds of that region. A "machine-trained model" (or "model" for brevity) refers to computer-implemented logic for executing a task using machine-trained weights that are produced in a training operation. In some contexts, terms such as "component," "module," "engine," and "tool" refer to parts of computer-based technology that perform respective functions. FIGS. 3 and 25, described below, provide examples of illustrative computing equipment for performing these functions.

A. Overview of the Computing System

The computing system 102 selects local information items in two stages. A localness-determining system 104 performs the first stage by assessing whether a candidate information item includes the type of content that qualifies as local in nature. A scope-determining system 106 performs the second stage by determining a particular geographic region associated with the information item. The particular geographic region associated with the information item is referred to below as the "item region," and is described by "item-region information."

An item-serving system 108 serves the information item to a user. In some implementations, the item-serving system 108 determines a "consumer region" that encompasses the location of a user. The consumer region is described by "consumer-region information." The item-serving system 108 provides the information item to a user upon determining that the consumer region is a part of the item region.

In some implementations, the item-region information uses a set of geohashes to describe the item region, each of prescribed length (such as four alphanumeric characters). The consumer-region information uses at least one geohash of prescribed length (such as four alphanumeric characters) to describe the consumer region. The geohash-encoding technique is one kind of curve-filling technique that provides a way of encoding map blocks of prescribed size and location using respective alphanumeric codes. For example, the geocode "9q8y" describes a particular cell having a width of ≤39.1 km and a height of ≤19.5 km, centered at a particular point in the city of San Francisco, California. Decreasing the size of a geohash increases the size of a corresponding cell. For example, a three-character geohash describes a block having a width and height of ≤156 km. Smaller cells located within a larger cell have the same prefix as the larger cell. For example, the geohash "9q8yw68fvufdm" refers to a specific region in San Francisco that includes John McLaren Park, within the above-described more encompassing geographic region of "9q8y." Other implementations use other geocoding techniques to describe regions on a map. The other geocoding techniques include other space-filling curve techniques, latitude and longitude information, Open Location Code (OLC) techniques, etc.

An overview of the features of FIG. 1 will now be provided, advancing from the top to the bottom of the figure. Later sections of this explanation provide additional details regarding the features summarized in FIG. 1.

The localness-determining system 104 receives candidate information items from one or more sources, depending on the application context in which the computing system 102 serves local information items to users (described below). Assume at this juncture that the localness-determining system 104 receives at least one candidate information item from a data store 110. A "candidate information item" is an information item (e.g., a news article) that has not yet been evaluated to determine whether it contains local content of interest to a local user. In some implementations, the data store 110 represents a repository of information items produced by one or more content publishers, for selective distribution to end users. One kind of content publisher is a media entity that produces news-related articles for distribution to end users.

The localness-determining system 104 uses a machine-trained classifier model to assess the localness of the candidate information item, without resolving the particular location and bounds associated with the candidate information item. A training system 112 iteratively trains the classifier model in a preliminary training operation. In some implementations, the training can also be performed in parallel with the production-stage use of the computing system 102. As will be more fully described below in Section D, the training system 112 performs its training based on a set of training examples, using a weakly-supervised dataset. An example-mining system (not shown) produces the training examples using an ensemble of different example-mining processes.

The scope-determining system 106 includes a region-identifying system 114 that identifies a plurality of candidate regions associated with the candidate information item. To perform this task, the region-identifying system 114 uses an ensemble of different region-identifying components, including a first region-identifying process 116 and an Nth region-identifying process 118. Different region-identifying processes may identify different subsets of candidate regions, each of which is described by a four-character geohash. The region-identifying system 114 stores information regarding the identified candidate regions in a data store 120. A region-selecting component 122 selects from among the candidate regions in the data store 120, to produce a final set of candidate regions, and stores information regarding the final set in a data store 124. The final set of candidate regions collectively constitutes a particular geographic area associated with the information item. As noted above, the particular geographic region is referred to herein as the "item region." Further, the item region is defined by item-region information, e.g., by the geohashes that compose the item region. In some implementations, the region-selecting component 122 chooses the final set of candidate regions using rule information stored in a data store 126.

An item-selecting component 128 determines a consumer region associated with a current location of the user. As noted above, the consumer region is described by "consumer-region information," which, in turn, corresponds to at least one geohash. Assume that the consumer region is part of the item region, meaning that the geohash associated with the consumer region is one of the geohashes associated with the item region. If so, the item-selecting component 128 provides an output result that indicates that the information item should be served to the user.

In some cases, the user's current location reflects the actual current position of the user. The item-selecting component 128 identifies the geohash of length 4 in which this position is located. In other cases, the user's location is associated with a representative location of the user, e.g., as registered by the user or some other entity. For instance, the user's location may correspond to any of: the location of a user's Internet service provider; the location specified by one or more settings of a browser program; the user location registered by a weather application; the location specified in one or more user profiles, and so on.

Assume that the user is physically present in the consumer region. A position-determining system (not shown) can determine the location of the user using any combination of techniques, including: a Global Positioning System (GPS) technique; a triangulation technique (which involves triangulating wireless signals received from three or more wireless signal sources, such as cell towers); a beacon technique (which involves determining the user's proximity to one or more wireless beacon sources having known positions); and/or a dead-reckoning technique, etc.

An application system 130 delivers the information item to the user in different application contexts, described in greater detail below. Consider the illustrative case of a newsfeed application, which is one such application context. Assume that the data store 110 provides a repository of current news articles provided by one or more publishers. The newsfeed application uses the computing system 102 to classify each of the news articles as "local" or "non-local" or "underdetermined." Further assume that the newsfeed application determines that the user is currently located at a particular location, associated with a particular consumer region described by a particular four-character geohash. First, the newsfeed application determines the subset of the news articles in the data store 110 which: (1) are assessed as "local"; and (2) have item regions that include the identified consumer region. The newsfeed application then uses any environment-specific ranking algorithm to rank this subset of news articles based on any combination of ranking factors, such as click rate, extent to which the articles match known characteristics (if any) of the user, and so on. The newsfeed application then delivers the top-ranked K news articles to the user.

Assume that the newsfeed application cannot identify a required number of information items that satisfy the above test. In some implementations, the newsfeed application addresses this shortfall by adding information items to a user's feed that are pertinent to a nearest population center to the user's present location (e.g., a nearest city). The newsfeed application uses any environment-specific criteria to determine what qualifies as a nearest population center.

Figure 2:
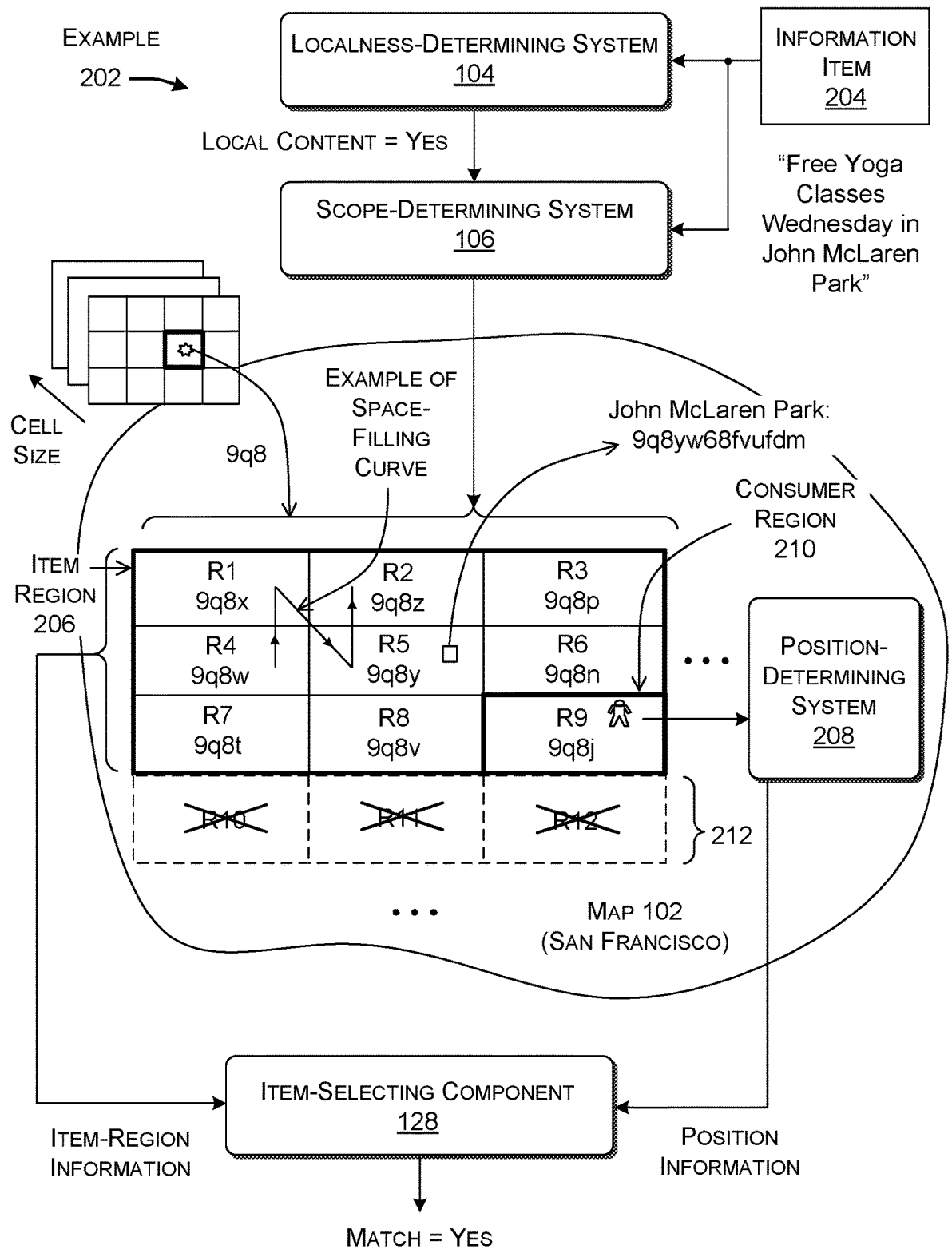
FIG. 2 shows an example of the operation of the computing system of FIG. 1.

FIG. 2 shows an example 202 of the operation of the computing system 102 of FIG. 1. Assume that the candidate information item 204 is a news article about a class to be held in a local park in San Francisco, California. The article bears the title: "Free Yoga Classes Wednesday in John McLaren Park." The localness-determining system 104 classifies this information item 204 as "local." The scope-determining system 106 determines that an item region 206 corresponds to a part of the city of San Francisco, California, described by a group of nine four-character geohashes. Assume that a position-determining system 208 uses any of the techniques described above to establish the actual current location or presumed location of the user. For instance, the position-determining system 208 can use a GPS device (not shown) associated with a smartphone carried by the user to determine that the user is currently located at a particular position in the city of San Francisco. Alternatively, or in addition, the user's Internet service provider and/or browser setting(s) establish that the user is associated with a particular location in the San Francisco region.

The item-selecting component 128 maps the user's position information to a consumer region 210, described by consumer-region information. In this case, the consumer-region information specifies a four-character geohash "9q8j". The item-selecting component 128 determines that the consumer-region information includes one of the nine geohashes associated with the item-region information. As such, the item-selecting component 128 determines that it is appropriate to serve the information item to the user.

In the example of FIG. 2, the item region is composed of a single region composed of neighboring geohashes. In other cases, the computing system 102 determines that the item region includes one or more sub-regions that do not necessarily neighbor each other. For example, consider a news article about a football championship game between two college teams, to be played in a city that is non-native to both of the college teams. Depending on the specific nature of the content of this article, the "item region" in this case may encompass any of: parts of a first city associated with the first team; parts of a second city associated with the second team; and/or parts of the city where the game is to be played. A user who is located in any these three cities may be an appropriate recipient of the news article. In other cases, the computing system 102 may conclude that the city in which the game is played is largely incidental, and not germane to the local content of the article.

FIG. 3 shows illustrative computing equipment 302 that, in some implementations, is used to implement the computing system 102 of FIG. 1. The computing equipment 302 includes a set of local devices 304 coupled to a set of servers 306 via a computer network 308. Each local device corresponds to any type of computing device, including any of a desktop computing device, a laptop computing device, a handheld computing device of any type (e.g., a smartphone or a tablet-type computing device), a mixed reality device, an intelligent appliance, a wearable computing device (e.g., a smart watch), an Internet-of-Things (IoT) device, a gaming system, a media device, a vehicle-borne computing system, any type of robot computing system, a computing system in a manufacturing system, etc. In some implementations, the computer network 308 is implemented as a local area network, a wide area network (e.g., the Internet), one or more point-to-point links, or any combination thereof.

The dashed-line box in FIG. 3 indicates that the functionality of the computing system 102 is capable of being spread across the local devices 304 and/or the servers 306 in any manner. For instance, in some cases, each local commuting device, or a group of affiliated local computing devices, implements the entirety the computing system 102. In other implementations, the bulk of the data-processing operations performed by the computing system 102 are allocated to the servers 306. Here, an end user interacts with the servers 306 via a browser application or some other computer interface. In other cases, the processing functions of the computing system 102 are distributed between the local devices 304 and the servers 306. For example, in some implementations, at least some of the processing functions performed by the localness-determining system 104 and the scope-determining system 105 are implemented by the servers 306.

B. The Localness-Determining System

Figure 4:
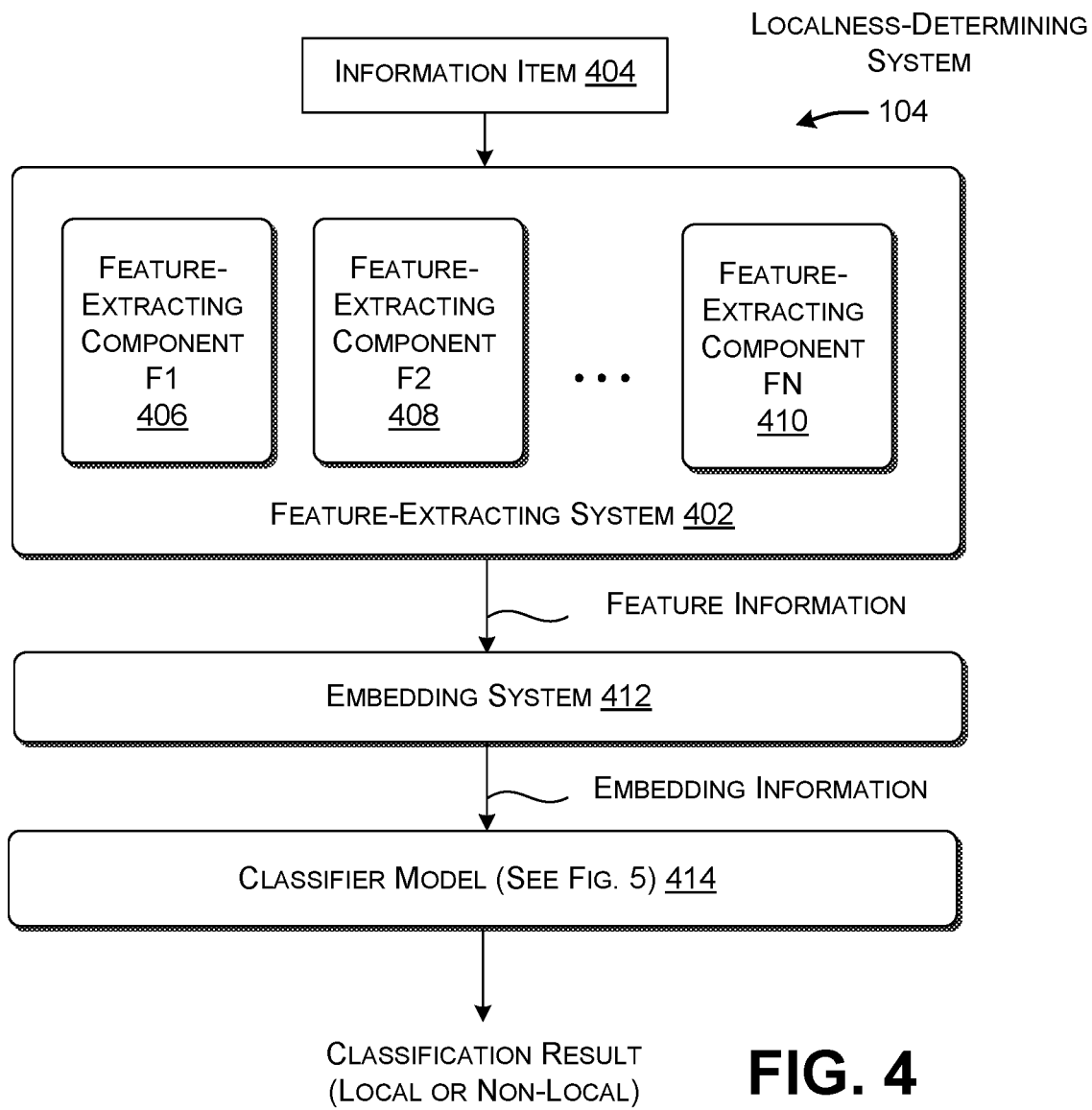
FIG. 4 shows an illustrative localness-determining system, which is one component of the computing system of FIG. 1.

FIG. 4 shows one implementation of the localness-determining system 104. The localness-determining system 104 uses machine-trained logic to provide a binary classification result. The result indicates whether or not a candidate information item is likely to include local content.

A feature-extracting system 402 first extracts feature information from a candidate information item 404 using one or more feature-extracting components (406, 408, . . . , 410). In some implementations, the first feature-extracting component extracts topics expressed in the information item 404. A second feature-extracting component extracts summary information from the information item 404, and expresses the summary information as a tag-line or article digest, etc. A third feature-extracting component extracts the title of the information item 404. A fourth feature-extracting component extracts parts of the URL information associated with the information item 404, and so on.

The fourth feature-extracting component optionally filters out publisher-related information expressed in the URL information because this information may bias training of the machine-trained logic that governs the localness-determining system 104. The fourth feature-extracting component also filters out numeric information from the URL information. The fourth feature-extracting component also filters out title information expressed in the URL information in certain cases. For example, the fourth feature-extracting component removes title information from the URL information if that title information duplicates a prescribed amount of the actual title of the information item 404, which is separately extracted by the third feature-extracting component.

The feature-extracting system 402 relies on any combination of tools to perform its tasks. For example, the feature-extracting system 402 extracts topics using a Latent Dirichlet model, a tag-sequencing model (e.g., a Conditional Random Fields model), Term Frequency-Inverse Document Frequency (TF-IDF) analysis, and so on. In addition, or alternatively, the feature-extracting system 402 identifies topics in the information item 404 using any type of neural network, such as a Feed Forward Neural Network (FNN), a Convolutional Neural Network (CNN), a transformer-based model, a Recurrent Neural Network (RNN), and so on, or any combination thereof.

Likewise, in some implementations, the feature-extracting system 402 relies on any kind of neural network to extract summary information from the information item 404. For instance, the feature-extracting system 402 may use a transformer-based neural network to identify the sentence of a news article that receives a highest attention score. This sentence serves as a summary of the article. Background information on the general subject of neural network technology to perform topic-extraction and summarization can be found at: Zhao, et al., "Topic Modelling Meets Deep Neural Networks: A Survey," arXiv, Cornell University, arXiv:2103.00498v1 [cs.LG], Feb. 28, 2021, 8 pages; and Dong, Yue, "A Survey on Neural Network-Based Summarization Methods," arXiv, Cornell University, arXiv: 1804.04589v1 [cs.CL], Mar. 19, 2018, 16 pages.

An embedding system 412 converts the feature information into a sequence of embedding vectors, generally referred to as embedding information. For instance, the embedding system 412 concatenates the various features described above into a string of alphanumeric tokens. In some cases, a "token" refers to a unit of text having any granularity, such as an individual word or numerical value, a word fragment produced by byte pair encoding (BPE), a character n-gram, a word fragment identified by the WordPiece algorithm, etc. In some implementations, the embedding system 412 also inserts special tokens in the sequence, such as a classification ("CLS") token at the start of the sequence, and separator ("SEP") tokens between different kinds of features.

The embedding system 412 maps the sequence of tokens into respective embedding vectors. The embedding system 412 then adds embedded position information to the respective embedding vectors, to produce position-supplemented embedded vectors. In some implementations, the embedding system 412 also adds embedded segment information to each of the position-supplemented vectors. A segment describes a part of the feature information to which a token belongs.

A classifier model 414 maps the embedding information produced by the embedding system 412 to a binary classification result, indicating whether or not the information item 404 is likely to include local content. The classifier model 414 performs this task using any type of machine-trained model, including: a Support Vector Machine (SVM) model, a decision tree model, a Turing model, a Naïve Bayes model, any type of neural network, and so on.

Figure 5:
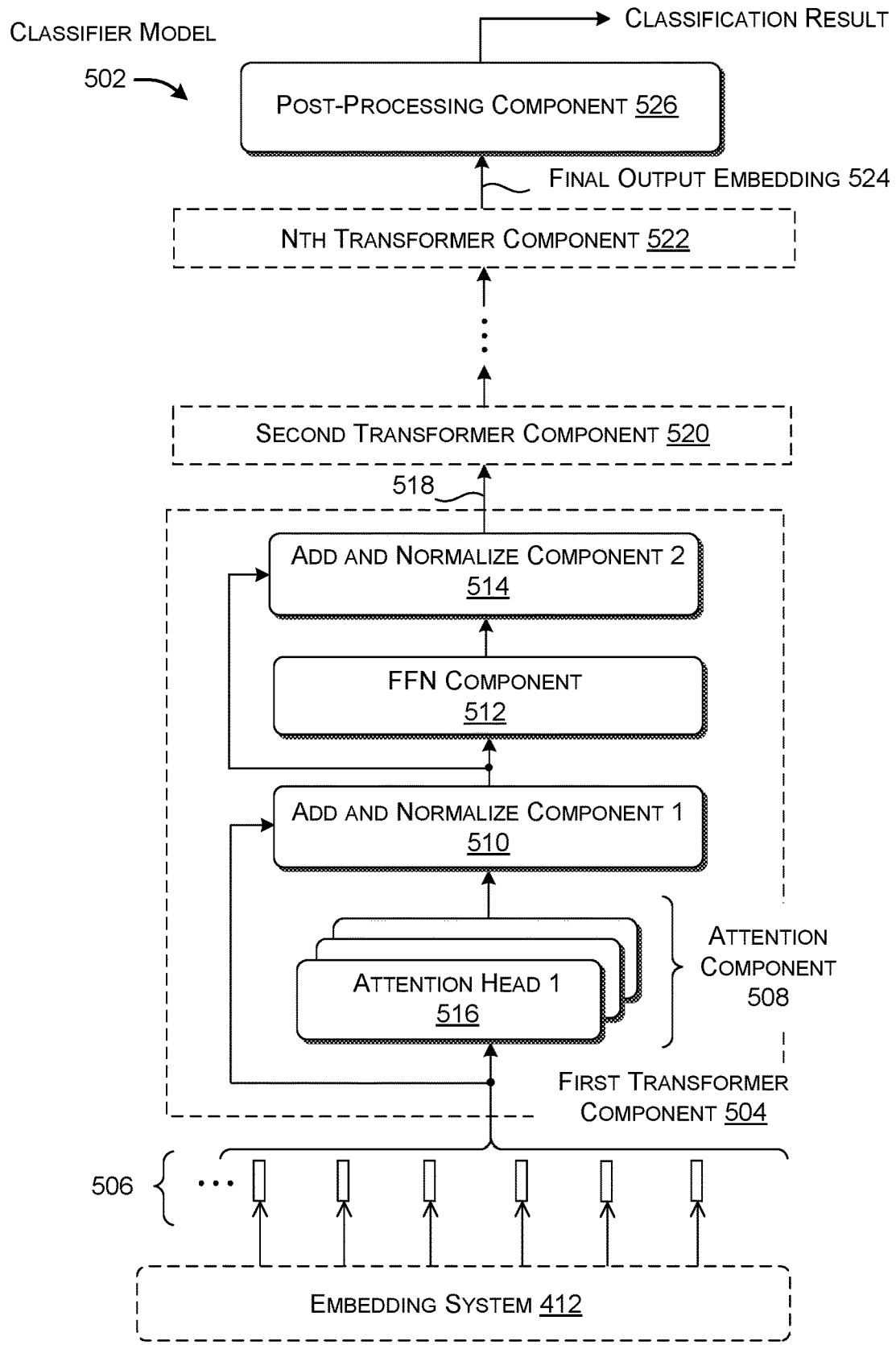
FIG. 5 shows a transformer-based classifier model for use in the localness-determining system of FIG. 4.

FIG. 5 shows a transformer-based classifier model 502 for use in the localness-determining system 104 of FIG. 4. As noted above, the localness-determining system 104 can use any machine-trained classifier model. Thus, the details described with reference to FIG. 5 are to be understood as illustrative of just one way to implement the localness-determining system 104.

The classifier model 502 includes a pipeline of N transformer components, including a first illustrative transformer component 504. Other transformer components have the same architecture, and perform the same functions, as the first transformer component 504, but with respect to a different set of machine-trained weights. The first transformer component 504 operates on the embedding information produced by the embedding system 412, which includes a sequence of input vectors 506. In some implementations, the first transformer component 504 includes, in order, an attention component 508, a first add-and-normalize component 510, a feed-forward neural network (FFN) component 512, and a second add-and-normalize component 514.

The attention component 508 performs attention analysis using the following equation:

$$attn(Q, K, V) = \text{Softmax}\left(\frac{QK^T}{\sqrt{d}}\right)V. \quad (1)$$

The attention component 508 produces query information Q by multiplying the input vectors 506 by a query weighting matrix $W^Q$. Similarly, the attention component 508 produces key information K and value information V by multiplying the position-supplemented embedding vectors by a key weighting matrix $W^K$ and a value weighting matrix $W^V$, respectively. To execute Equation (1), the attention component 508 takes the dot product of Q with the transpose of K, and then divides the dot product by a scaling factor $\sqrt{d}$, to produce a scaled result The symbol d represents the dimensionality of Q and K. The attention component 508 takes the Softmax (normalized exponential function) of the scaled result, and then multiplies the result of the Softmax operation by V, to produce attention output information. More generally stated, the attention component 508 determines how much emphasis should be placed on parts of the input information when interpreting other parts of the input information. Background information regarding the general concept of attention is provided in Vaswani, et al., "Attention Is All You Need," arXiv, Cornell University, arXiv: 1706.03762v5 [cs.CL], Dec. 6, 2017, 15 pages.

Note that FIG. 5 shows that the attention component 508 is composed of plural attention heads, including a representative attention head 516. Each attention head performs the computations specified by Equation (1), but with respect to a particular representational subspace that is different than the subspaces of the other attention heads. To accomplish this operation, the attention heads perform the computations described above using different respective sets of query, key, and value weight matrices. Although not shown, the attention component 508 concatenates the output results of the attention component's separate attention heads, and then multiplies the results of this concatenation by another weight matrix $W^O$.

The add-and-normalize component 510 includes a residual connection that combines (e.g., sums) input information fed to the attention component 508 with the output information generated by the attention component 508. The add-and-normalize component 510 then normalizes the output information generated by of the residual connection, e.g., by normalizing values in the output information based on the mean and standard deviation of those values. The other add-and-normalize component 514 performs the same functions as the first-mentioned add-and-normalize component 510. The FFN component 512 transforms input information to output information using a feed-forward neural network having any number of layers.

The first transformer component 504 produces an output embedding 518. A series of other transformer components (520, . . . , 522) perform the same functions as the first transformer component 504, each operating on an output embedding produced by its immediately preceding transformer component. Each transformer component uses its own level-specific set of machine-trained weights. The final transformer component 522 in the classifier model 502 produces a final output embedding 524.

A post-processing component 526 performs post-processing operations on the final output embedding 524, to produce the final classification result. In one case, for instance, the post-processing component 526 includes one or more convolutional layers followed by a fully-connected FFN having any number of layers. The output of the post-processing component 526 is a binary YES/NO result indicating whether the information item 404 includes local content.

Consider the illustrative case in which the embedding system 412 appends a special token CLS to the beginning of the sequence of tokens. The classifier model 502 maps this CLS token to a final output vector in the final output embedding 524. In some implementations, the post-processing component 526 operates by mapping the output vector associated with the CLS token to the binary classification result.

C. Scope-Determining System

Upon concluding that a candidate information item contains local content, the computing system 102 advances to a second stage of analysis performed by the scope-determining system 106. As described above, the scope-determining system 106 determines the geographic scope associated with the candidate information item, as expressed by item-region information. FIG. 6-12 describe different region-identifying components that generate different subsets of candidate regions. The region-selecting component 122 chooses from among the subsets of candidate regions, to produce a final set of regions, which collectively constitute the item region.

In many cases, any two region-identifying components will propose two respective sets of candidate regions that have mostly the same members. However, any region-identifying component can propose a region that is not identified by another region-identifying component, and vice versa. Further, in some cases, the region-selecting component 122 will decline to select a candidate region proposed by the region-identifying system 114. In the example of FIG. 2, the region-selecting component 122 has declined to select at least three candidate regions 212. Overall, different region-selecting components have respective strengths and weaknesses in assessing the geographic regions associated with a particular candidate information item. The ensemble approach used by the scope-identifying system 106 integrates the capabilities of different region-identifying components to reduce the impact of the weaknesses of any particular components, and to overall improve the accuracy at which the scope-identifying system 106 identifies the location and bounds associated with an information item.

Figure 6:
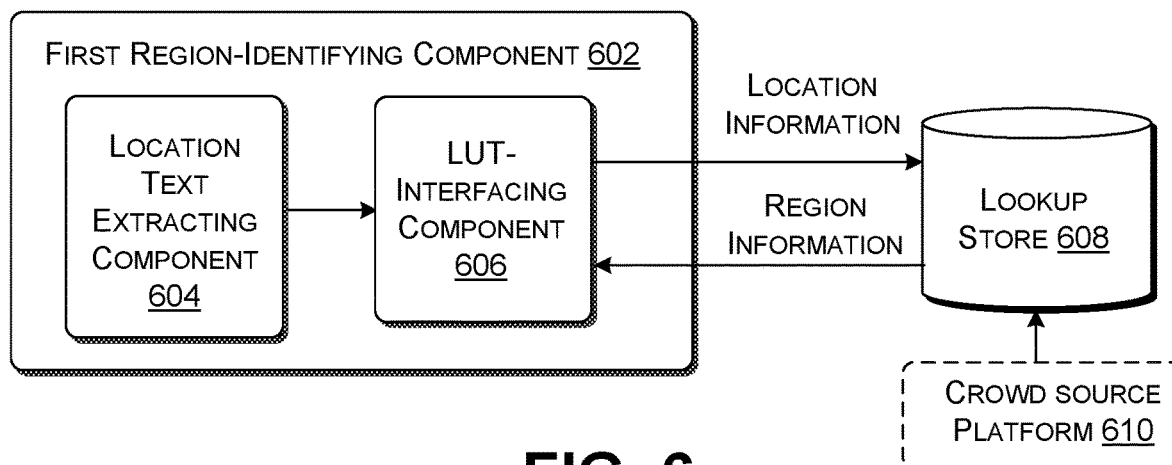
FIG. 6 shows a first region-identifying component, for use in a scope-determining system, which is another component of FIG. 1.

FIG. 6 shows a first region-identifying component 602 for generating a first subset of candidate regions associated with a candidate information item. A location text-extracting component 604 extracts any geographic name information from the candidate information item, e.g., using any of the feature-extracting techniques described with reference to FIG. 4. A LUT-interfacing component 606 then consults a lookup table (LUT) in a data store 608 to find a set of geohashes associated with the geographic name information.

In some implementations, a developer creates the lookup table by extracting geographic name information from a plurality of candidate information items. For each instance of geographic name information, the developer then interacts with a map system (described below) to identify a set of geohashes associated with the instance of geographic name information. The developer can then optionally validate the pairing of the geographic name information and the set of geohashes using a crowd-sourcing platform 610 of any type. The above approach to mapping an information item to geohashes provides accurate name-to-location information in some cases. But this approach otherwise scales poorly, and the lookup table may only describe a limited number of geographic features.

Figure 7:
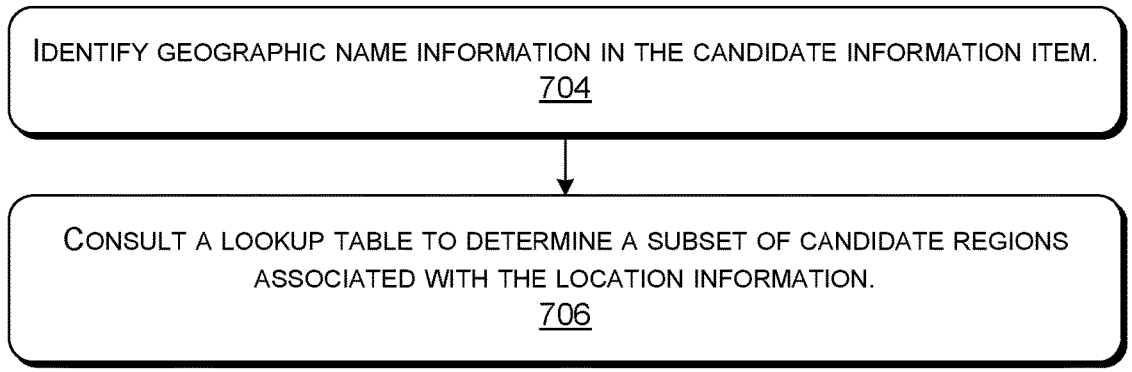
FIG. 7 shows a process that describes one manner of operation of the first region-identifying component of FIG. 6.

FIG. 7 shows a process 702 that describes one manner of operation of the first region-identifying component 602 of FIG. 6. As a preliminary clarification, the following general information applies to all processes described in this Detailed Description, including the process 702. The process 702 is expressed as a series of operations performed in a particular order. But the order of these operations is merely representative, and the order of operations can be varied in other implementations. Further, any two or more operations described below can be performed in a parallel manner. In one implementation, the blocks shown in the process 702 that pertain to processing-related functions are implemented by the hardware logic circuitry described in connection with FIGS. 3 and 25, which, in turn, is implemented by one or more processors, a computer-readable storage medium, etc.

In block 704, the first region-identifying component 602 identifies geographic name information in the candidate information item. In block 706, the first region-identifying component 602 consults a lookup table to determine a subset of candidate regions associated with the location information.

Figure 8:
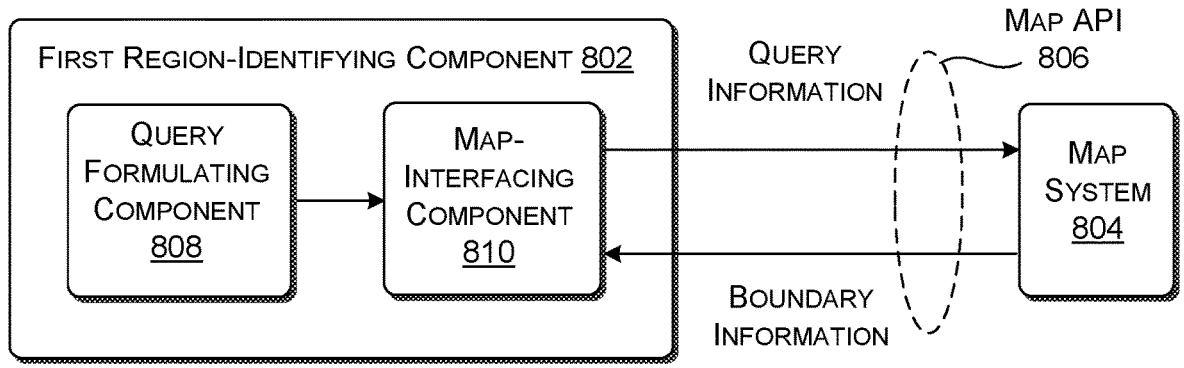
FIG. 8 shows a second region-identifying component for use in a scope-determining system of FIG. 1.

FIG. 8 shows a second region-identifying component 802 for generating another subset of candidate regions. The second region-identifying component 802 performs its task by interacting with a map system 804. The map system 804 provides an application programming interface (API) 806 that enables a user to make various kinds of map-related inquiries to the map system 804. Illustrative providers of map systems that perform this functions are: the "Find a Location by Query" feature of BINGS MAPS, provided by MICROSOFT CORPORATION, of Redmond, Washington; the "Text Search" feature of GOOGLE MAPS PLATFORM, provided by GOOGLE INC. of Mountain View, California; and various lookup features of OPENSTREETMAP NOMINATIM API, provided by openstreetmap.org, the code of which is available at the GitHub code repository.

A query-formulating component 808 formulates one or more queries based on the content provided by a candidate information item. For example, the query-formulating component 808 can formulate one or more queries that specify any of: the title of the information item; URL information extracted from the information item; body-content information extracted from the body of the information item; selected entity names and/or other information extracted from the information item, and so on. In other cases, the query omits the URL information, or at least portions of the URL information, to avoid biasing the retrieval results. A map interfacing component 810 submits the query(ies) to the map system 804. The map system 804 generates a response to each such query.

Figure 9:
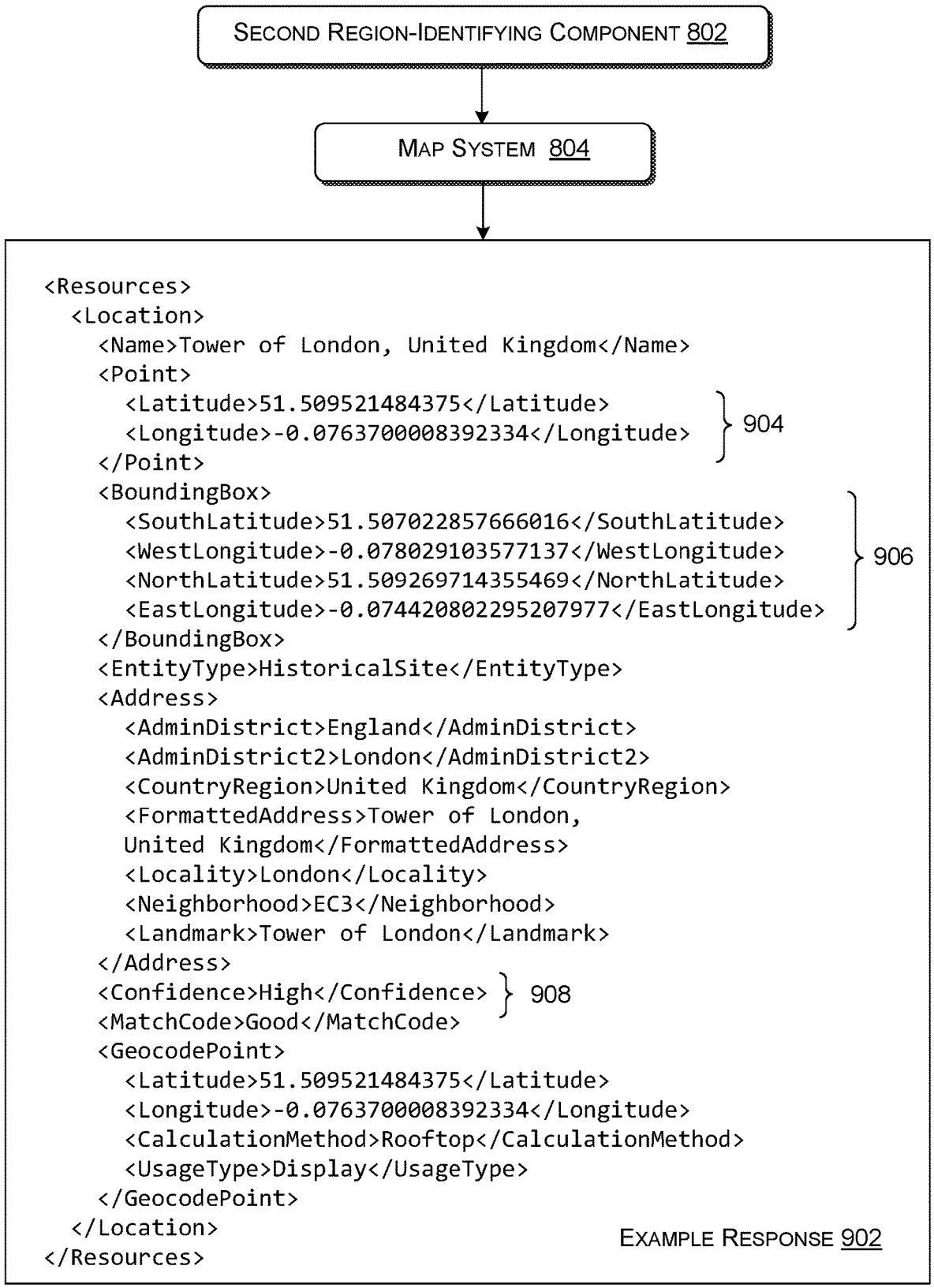
FIG. 9 shows an example of the operation of the second region-identifying component of FIG. 8.

FIG. 9 shows an example of a response 902 delivered by the map system 804, in response to a query that specifies the name of the "Tower of London," a well-known landmark in the United Kingdom. The response 902 specifies various information items pertaining to the query, such as: the latitude and longitude coordinates 904 of the specified landmark; a bounding box 906 associated with the landmark, specified in latitude and longitude coordinates, and a confidence score 908 associated with the response 902. The confidence score 908 indicates a degree of confidence that the information provided in the response 902 is correct. The bounding box 906 specifies a geographic region associated with the landmark, and is generally referred to herein as "boundary information."

Different implementations of the map system 804 generate the type of response 902 shown in FIG. 9 in different respective ways. In some systems, the map system 804 consults a lookup table, knowledge graph, etc. to map the query information to output information. Alternatively, or in addition, the map system 805 uses a machine-trained model to map the query information to the response 902. One illustrative map system performs this mapping function using a deep neural network of any type, including any of a CNN, a transformer-based model, etc. In some implementations, the map system 804 generates a high confidence score if it finds an exact match for the query information. The map system 804 generates a lower-valued score if it can only identify features that are nearby a geographic feature specified in the query information, and/or if the query information specifies a geographic feature in an ambiguous manner, which permits different interpretations of the query information.

In some implementations, the map interface component 810 identifies one or more geohashes associated with the boundary information in the response 902. For example, again assume that the response 902 specifies a bounding box 906 in latitude and longitude coordinates. In this case, the map interface component 910 identifies the four-character geohashes that "fit" into this bounding box 906. In other implementations, the map system 804 directly provides the geohash(es) in its response to the query information.

Figure 10:
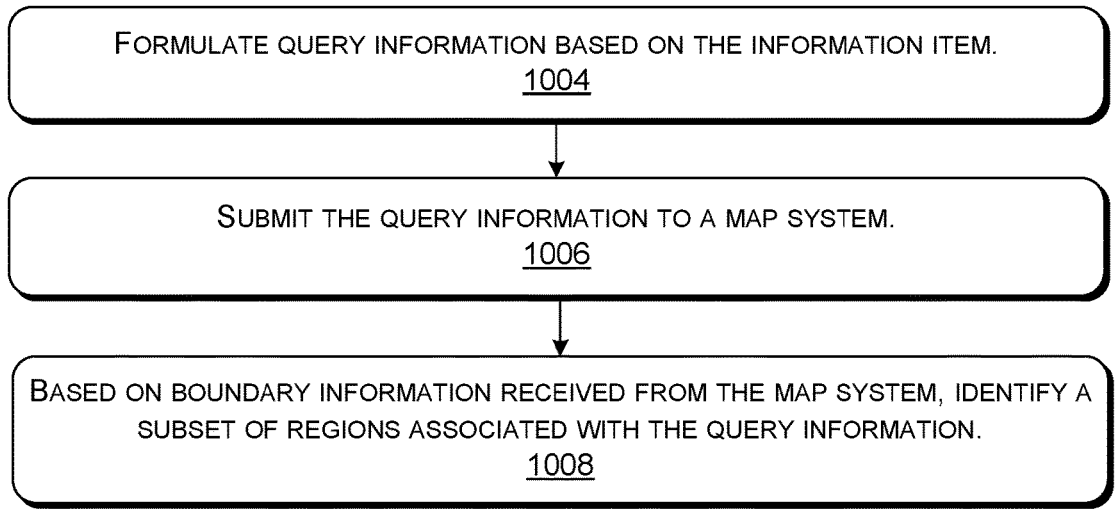
FIG. 10 shows a process that describes one manner of operation of the second region-identifying component of FIG. 8.

FIG. 10 shows a process 1002 that describes one manner of operation of the second region-identifying component 802 of FIG. 8. In block 1004, the second region-identifying component 802 formulates query information based on the information item. In block 1006, the second region-identifying component 802 submits the query information to the map system 804. In block 1008, the region-identifying component 802 receives boundary information from the map system 804 in response to the query information (e.g., as specified by the bounding box 906). The second region-identifying component 802 identifies a subset of regions (e.g., geohashes) associated with the boundary information, if not directly specified in the response from the map system 804.

Figure 11:
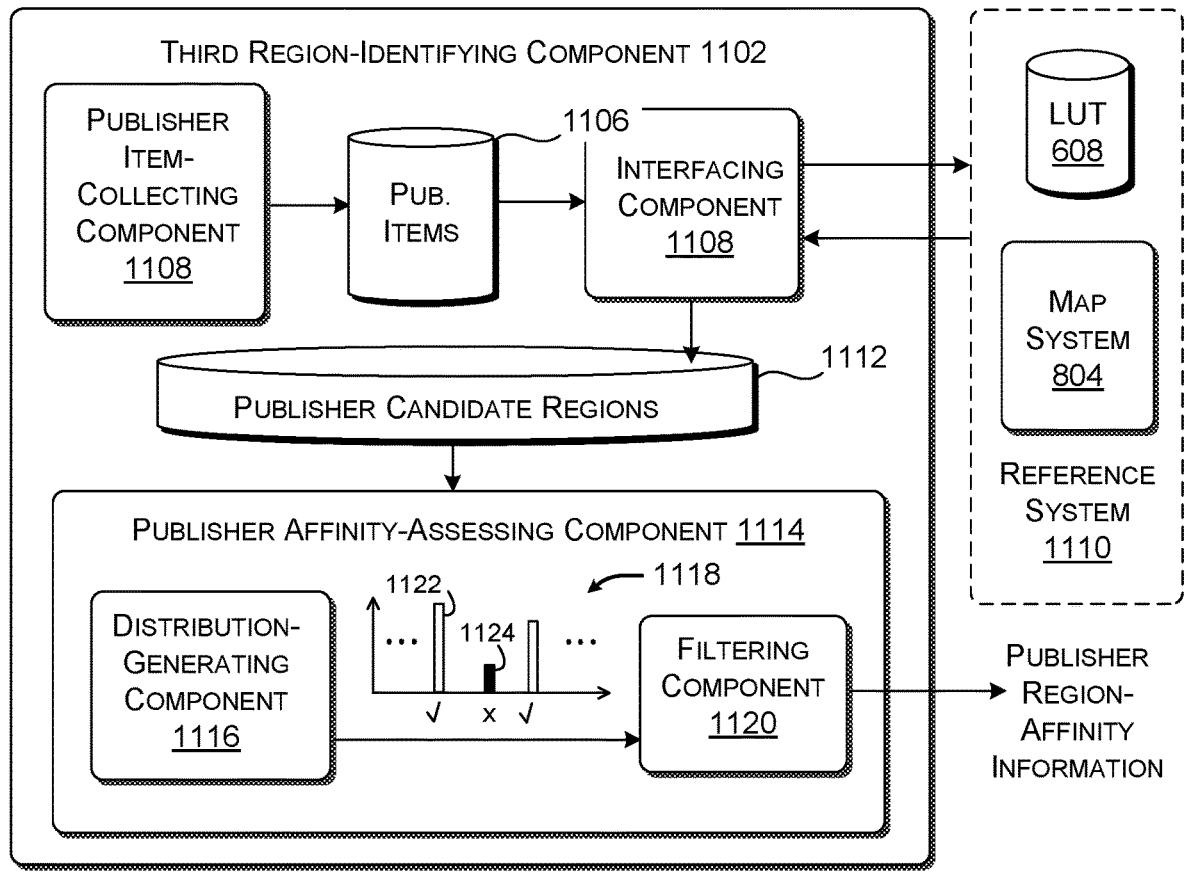
FIG. 11 shows a third region-identifying component for use in the scope-determining system of FIG. 1.

FIG. 11 shows a third region-identifying component 1102 for generating another subset of regions. A publisher item-collecting component 1104 identifies a plurality of information items published by a particular publisher, and stores the particular information items (or references to the particular information items) in a data store 1106. In some cases, the publisher is a particular type of publisher previously identified as a strongly-local provider, per the technique described below in Section D in the description of FIGS. 18 and 19. An interfacing component 1108 then interacts with a reference system 1110 to identify a subset of candidate regions (e.g., geohashes) associated with each of the information items. The reference system 1110 includes the previously-described data store 608 that provides a lookup table and/or the map system 804.

Different implementations of the interfacing component 1108 identify the geohashes in different ways. Consider a particular candidate information item published by a particular publisher. In some implementations, the interfacing component 1108 first consults the reference system 1110 to determine geographic name information associated with the publisher's information items. The interfacing component 1108 then uses the name information to query to the reference system 1110, with the objective of retrieving bounding boxes associated with respective instances of geographic name information. The interfacing component 1108 then converts each bounding box into a subset of candidate regions (e.g., as described by respective geohashes). A data store 1112 stores information regarding the regions identified in the above-described manner.

A publisher-affinity-assessing component 1114 determines whether the publisher has an affinity to particular regions. To perform this task, a distribution-generating component 1116 generates a distribution 1118, which expresses the prevalence of different regions in the publisher's information items. For example, a first entry in the distribution 1118 indicates that a first geohash has a frequency-of-occurrence of 1500 in the set of the publisher's information items, while a second geohash has a frequency-of-occurrence of 50 in the set of publisher's information items. This conveys that the publisher provides content that more heavily favors events associated with the first geohash, compared to the second geohash, A filtering component 1120 removes one or more geohashes (if any) from the subset of geohashes in the data store 1112 that are determined to have low frequency-of-occurrences. In some implementations, the filtering component 1120 makes this determination by finding the geohash having the maximum frequency-of-occurrence (F_Max), e.g., associated with entry 1122 in the distribution 1118. The filtering component 1120 then generates a normalized measure of the difference between the maximum frequency-of-occurrence (F_Max) and the frequency-of-occurrence of each other geohash in the distribution. Consider the particular geohash associated with the entry 1124 in the distribution 1118, having frequency-of-occurrence F_o. The filtering component computes a gap ratio by computing the difference between the maximum frequency-of-occurrence (F_Max) and F_o, and then dividing this difference by F_Max. The filtering component 1120 retains any geohash having a gap-ratio metric below a prescribed environment specific threshold, such as 0.25; otherwise, the filtering component 1120 removes the entry. For instance, the filter component 1120 may determine that it is appropriate to remove the geohash associated with the entry 1124 because the normalized difference between its frequency-of-occurrence (F_o) and F_Max satisfies the above test for removal.

In some implementations, the filtering component 1120 specifically removes geohashes (if any) in two or more phases. For example, in a first pass, the filtering component 1120 removes geohashes of length three based on the above-described gap-ratio analysis. In a second pass, the filtering component 1120 removes geohashes of length four based on the above-described gap-ratio analysis. The first pass removes relatively large regions that are determined to be poorly covered by the publisher's information items. For instance, this pass may determine that it is appropriate to remove one or more geohashes associated with the eastern part of the United States. The second pass removes regions on a state and county level based on the same considerations. For example, this pass may determine that it is appropriate to remove one or more geohash associated with city of Spokane, Washington from distribution that heavily favors the Seattle region of Washington State. The output of the publisher-affinity-assessing component 1114 is a set of candidate regions (e.g., geohashes) with which a particular publisher has a strong affinity. If a candidate item under consideration is published by this particular publisher, it can be assumed that the information item is associated with the candidate regions to which it has high affinity (if any).

Note that the third region-identifying approach is particularly effective for addressing the case in which a publisher's information item may have local content, despite the inclusion of unambiguous name information in the information item. For instance, assume that a publisher has been identified as a strongly-local publisher with an affinity to the King County region of Seattle, Washington, United States. Further assume that an information item being considered uses an acronym to refer to a local construction project in King County. The other region-identifying components may fail to identify this information item as having local content. But the third region-identifying component presumes by default that the information item has local content pertaining to King County, because the publisher is known to publish information items of local interest.

FIG. 12 shows a process 1202 that describes one manner of operation of the third region-identifying component 1102. In block 1204, the third region-identifying component 1102 collects a set of information items associated with a particular publisher. In block 1206, the third region-identifying component 1102 interacts with the reference system 1110 to determine a first subset of candidate regions associated with the particular publisher. In block 1208, the third region-identifying component 1102 generates the distribution 1118 of candidate regions in the first subset of candidate regions, the distribution 1118 expressing a frequency at which each candidate region in the first subset of candidate regions appears in the first subset of candidate regions. In block 1210, the third region-identifying component 1102, based on the distribution 1118, identifies and removes a particular region from the first subset of candidate regions that satisfies a prescribed test for removal, to produce a final subset of regions. In practice, the third-identifying component 1102 can remove zero, one, or more regions in block 1210.

The region-selecting component 122 (of FIG. 1) consults rule information in the data store 126 to select a final set of regions for a particular candidate information item under consideration, selected from among the different subsets of regions identified by the region-identifying system 114. Different implementations apply different rules to perform this function. In one environment, the region-selecting component 122 applies the following rules, which are expressible in an IF-THEN format, a computer algorithm, a machine-trained model, etc., or any combination thereof. To facilitate description, the following description refers to geohashes identified by the first region-identifying component 602 as "LUT geohashes," the geohashes identified by the second region-identifying component 802 as "MAP geohashes," and the geohashes identified by the third region-identifying component 1102 as "publisher-affiliated (PA) geohashes."

Rule 1. Include the PA geohashes of length four identified by the third region-identified component if the publisher has been determined to be a strongly-local publisher with an affinity to the identified geohashes (per the method of FIG. 12). Rule 2. If the LUT geohashes and the PA geohashes have the same prefix of length two, include all LUT geohashes of length four. Rule 3. If the MAP geohashes and the PA geohashes have the same prefix of length two, include all MAP geohashes of length four. Rule 4. If there are no PA geohashes, and if the LUT geohashes and the MAP geohashes have the same prefix of length two, include all LUT geohashes and MAP geohashes of length four. Rule 5. If there are no PA geohashes or LUT geohashes, use the MAP geohashes that have a confidence score of "high." Rule 6. If none of the above-described rules apply, include no geohashes in the final set of geohashes; this rule will help maintain high overall precision in the performance of the scope-determining system 106.

FIG. 13 shows an evaluation system 1302 for evaluating the accuracy of the computing system 102. The evaluation system 1302 receives a first value that specifies the location of the item region, as predicted by the computing system 102. The evaluation system 1302 also receives a second value that specifies the location of the consumer, which is determined in any of the ways described above. The evaluation system 1302 generates a distance metric between these two values that generally corresponds to the distance between the item region and the consumer location. The evaluation system 1302 can use any metric to perform this function, such as a Euclidean distance metric or a great circle distance metric (which measures the distance between two points on the curved surface of the earth). Further, the evaluation system 1302 clamps the distance to zero when it concludes that the consumer location is within the item region. For example, in the scenario of FIG. 2, assume that the computing system 102 concludes that an information item is associated with nine neighboring length-four geohashes, generally overlapping at least part of the city of San Francisco. The evaluation system 1302 will indicate a distance of zero if the user is located anywhere within one of these nine geohashes. The evaluation system 1302 provides an accurate metric to predict the accuracy of the computing system 102, which, in turn, enables the training system 112 (described below) to performing training in a more effective manner.

FIG. 14 generally indicates that the application system 130 of FIG. 3 can leverage the computing system 102 in different ways, with respect to one or more application components. A search results-filtering component 1402 determines an extent to which an information item matches a query submitted by a user based, at least in part, on analysis performed by the computing system 102. A recommending component 1404 determines whether it is appropriate to recommend an information item to a user based, at least in part, on analysis performed by the computing system 102. A newsfeed-serving component 1406 determines the makeup of a stream of information items to be fed to a user based, at least in part, on analysis performed by the computing system 102. An alerting component 1408 alerts the user to issues that might demand the user's urgent attention based, at least in part, on the analysis performed by the computing system 102. For instance, based on analysis performed by the computing system 102, the alerting component 1408 may inform the user of an approaching storm, traffic stoppage, health-related incident, crime-related incident, etc.

A trend-assessing component 1410 identifies topics, entities, etc. that are being discussed in recent information items, based, at least in part, on analysis performed by the computing system 102. The trend-assessing component 1410 performs this function by identifying a set of information items that have a local geographic interest, and performing any type(s) of topic/entity extraction technique on the information items in this set, examples of which were described above. The trend-assessing component 1410 uses any user interface technique to expose its conclusions to a user. For example, in one case, the trend-assessing component 1410 provides an alert that indicates that a topic or entity is being frequently covered in recent information items of local geographic interest. Alternatively, or in addition, the trend-accessing component 1410 generates and displays a timeline that shows the evolution in the coverage of a particular subject of local interest. Alternatively, or in addition, the trend-assessing component 1410 generates a knowledge graph that shows the connections among two or more subjects of local interest, and so on.

In some implementations, the trend-assessing component 1410 combines the above trend analysis with an indication of the consumption rate of information items, as expressed by any of click-rate information, impression information, conversion information, etc. The trend-assessing component 1410 uses this insight to highlight topics/entities of local geographic interest that are currently capturing the attention of the user's local community.

In some implementations, a feedback component (not shown) detects when a user interacts with an information item that has been determined by the computing system 102 to have local content, to provide feedback information. In some implementations, a ranking system leverages the feedback information to more effectively select the local information items that will match the particular interests of this individual user.

The computing system 102 provides a number of technical benefits. First, the computing system 102 accurately determines whether a candidate information item is of local geographic interest, and then accurately determines a geographic scope associated with the information item. This allows the computing system 102 to increase the likelihood that a user who receives an information item tagged as "local" will meaningfully engage with the information item.

The computing system also provides a solution to a cold start scenario, in which a content provider must decide what information items to serve to a new user without knowing anything about the likes and dislikes of the user, as would be revealed by the user's selection (click) history (if the user chooses to share this information). In the absence of this behavioral information, the provider can leverage the computing system 102 to discover the kinds of local content that have a high likelihood of interesting the cold-start user, based on knowledge of the user's current location (actual or presumed). After some time, a cold-start user becomes a warm user. The computing system 102 is also effective at maintaining engagement with warm users.

From the user's perspective, the computing system 102 reduces the amount of informational noise in the stream of information items provided to the user. This allows the user to more efficiently interact with the application system 130. That is, for instance, the computing system 102 allows the user to more quickly converge on information items that match his or her interests, which enables the user to reduce his or her navigation selections within an information space. Further, the computing system 102 exposes the user to salient topics of local geographic interest, enabling the user to act on these topics in a timely manner. In some cases, this allows the user to effectively respond to emergency conditions, including the approach of a storm, health emergencies, school-related events, etc.

From the standpoint of a systems provider, the computing system 102 reduces the overall consumption of computer-related resources. That is, the computing system 102 can reduce the volume of information items served to users by tightening the focus of the information items that are sent to different users. A local computing system that receives and reacts to the information items benefits in a corresponding manner, e.g., by processing a reduced volume of information items of tighter focus.

D. The Training System

Figure 15:
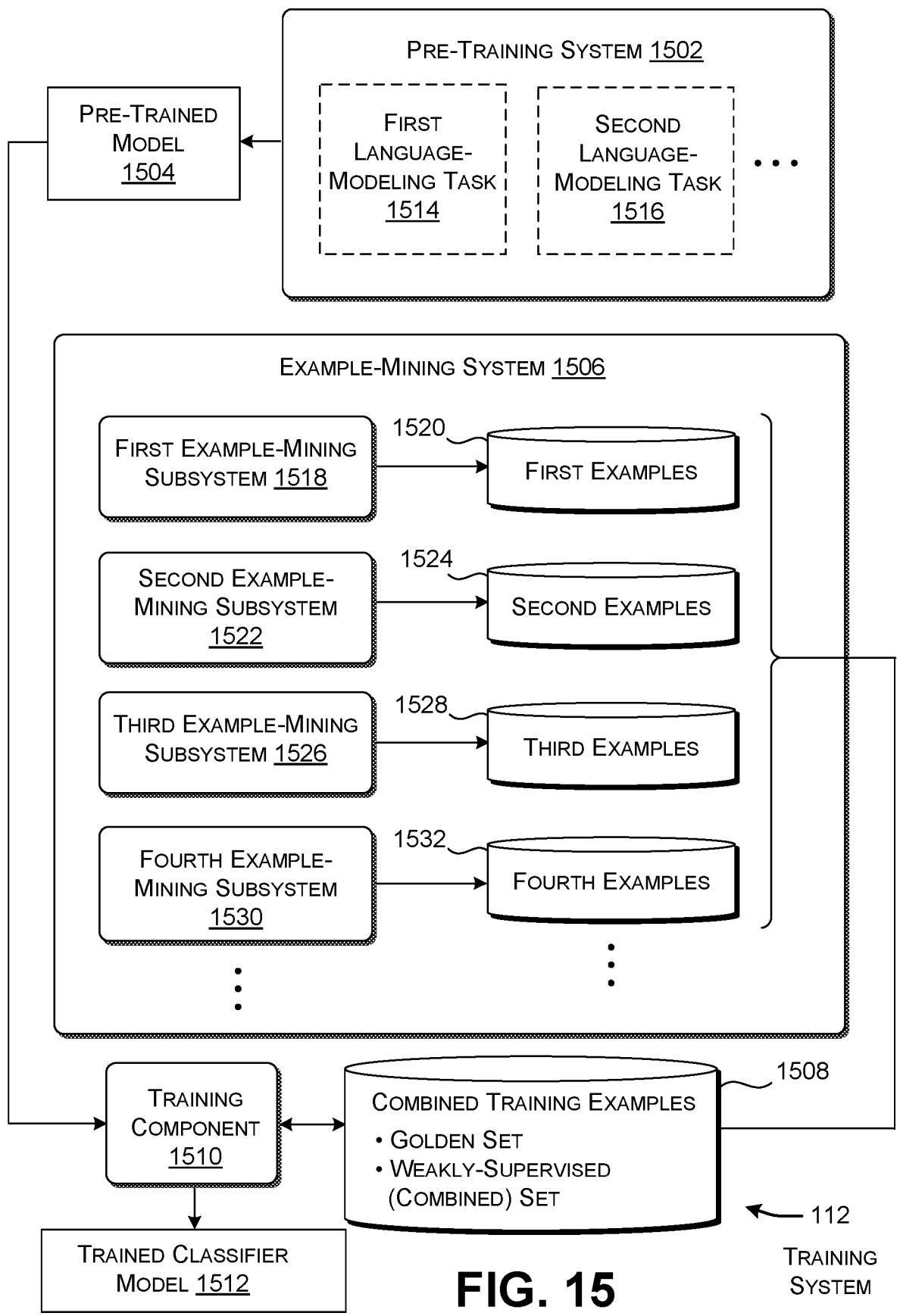
FIG. 15 shows an illustrative training system for training the localness-determining system of FIG. 1. The training system includes an example-mining system for mining training examples that are used to train the localness-determining system, via weak supervision.

FIG. 15 shows one illustrative training system 112, the purpose of which is to train the classifier model 414 of the localness-determining system 104 (a specific version of which is the classifier model 502 shown in FIG. 5). The training system 112 includes a pre-training system 1502 for producing a pre-trained model 1504. The training system 112 further includes an example-mining system 1506 for producing training examples, which it stores in a data store 1508. The training system 112 uses a training component 1510 to produce a final classifier model 1512 by refining the pre-trained model 1504, based on the training examples in the data store 1508. Other implementations use the training component 1510 to produce the classifier model 1512 without reference to any pre-trained classification model.

The pre-training system 1502 produces the pre-trained model 1504 by performing training on a large number of training examples (not shown), with respect to two or more language-modeling tasks (1514, 1516), independent of localness consideration. For instance, in a first language-modeling task 1514, the pre-training system 1502 masks selected tokens in the input information fed to the pre-trained model 1504. The pre-training system 1502 then assesses an extent to which the pre-trained model 1504 can successfully predict the identities of the masked tokens, and updates the weights of the pre-trained model 1504 accordingly.

In the second language-modeling task 1516, the pre-training system 1502 feeds two concatenated passages to the pre-trained model 1504, and measures the extent to which the pre-trained model 1504 can successfully predict whether the second passage properly follows the first passage (with reference to ground-truth information that indicates whether the second passage properly follows the first passage). The pre-training system 1502 then updates the weights of the pre-trained model 1504 accordingly.

In a third language-modeling task (not shown), the pre-training system 1502 measures an extent to which the pre-trained model 1504 can predict a next token that follows a sequence of prior tokens fed to the pre-trained model 1504, and updates the weights of the pre-trained model 1504 accordingly.

Other language-modeling tasks perform the counterpart of some of the above-described language-modeling tasks, with respect to passages drawn from parallel corpora. A parallel corpora provides passages in a first natural language and corresponding translations of those passages in a second natural language. An illustrative language-modeling task of this kind feeds a combination of a first-language passage and a counterpart second-language passage into the pre-trained model 1504, and then measures an extent to which the pre-trained model 1504 can successfully predict the identity of a masked token in the combination of tokens. The pre-training system 1502 then updates the weights of the pre-trained model 1504 accordingly.

Background information on the general topic of pre-training transformer-based neural networks is available at Devlin, et al., "BERT: Pre-training of Deep Bidirectional Transformers for Language Understanding," arXiv, Cornell University, arXiv: 1810.04805v2 [cs.CL], 24 May 2019, 16 pages. Information on the general topic of pre-training a multilingual model is available in Conneau, et al., "Cross-lingual Language Model Pretraining," arXiv, Cornell University, arXiv: 1901.07291v1 [cs.CL], Jan. 22, 2019, 10 pages.

The remainder of the training system 112 shown in FIG. 15 is dedicated to the task of refining the pre-trained model 1504, to produce the classifier model 414 used by the localness-determining system 104. To this end, the training system 112 creates "golden" set of training examples, each of which pairs a particular information item with a known classification (local or non-local) of the particular information item. In some implementations, a user or team of users manually creates the labels in the golden set of training examples.

In some implementations, the golden set is relatively small because it is expensive and resource-intensive to produce to this set. To address this shortcoming, the training system 112 uses weak supervision to produce a larger set of training examples, using the example-mining system 1506. More specifically, the example-mining system 1506 uses an ensemble of different example-mining subsystems to produce different subsets of training examples. Each training example includes a particular information item and a label presumed to be correct, although not manually specified by a user.

For instance, a first example-mining subsystem 1518 produces a first subset of training examples, which it stores in data store 1520. A second example-mining subsystem 1522 produces a second subset of training examples, which it stores in a data store 1524. A third example-mining subsystem 1526 produces a third subset of training examples, which it stores in a data store 1528. A fourth example-mining subsystem 1530 produces a fourth subset of training examples, which it stores in a data store 1532, and so on. The training examples in the data store 1508 represent the aggregate of the training examples in the subsystem's individual data stores (1520, 1524, 1528, 1532), together with the golden set (which can optionally be used for model testing).

From a more general perspective, the example-mining system 1506 uses an ensemble approach to generate training examples based on a recognition that any individual example-mining technique has respective strengths and weaknesses. Further, as described below, the ensemble approach specifically accounts for the relative paucity of training examples in non-native natural languages, such as non-English natural languages. It achieves this goal by increasing the number of non-English training examples, without corrupting learning performed on the English training examples.

The training component 1510 performs training on the training examples in the data store 1508 based on any technique, such as stochastic gradient descent in combination with backpropagation. In some cases, this involves fine-tuning the pre-trained model 1504 based on the training examples in the data store 1508.

Figure 16:
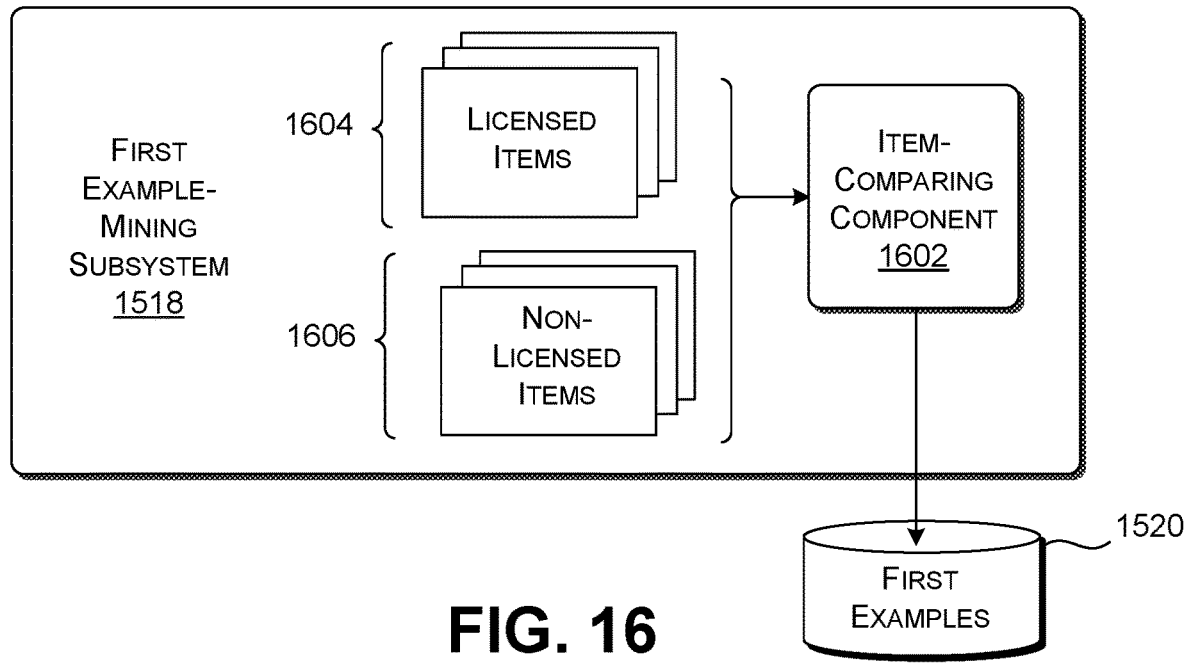
FIG. 16 shows a first example-mining subsystem, which is part of the example-mining system of FIG. 15.

FIG. 16 shows one implementation of the first example-mining subsystem 1518 that uses a distant supervision approach to mine training examples. An item-comparing component 1602 finds at least one licensed information item (selected from a set of licensed items 1604) that matches a non-licensed information item (selected from a set of non-licensed information items 1606). The first example-mining system 1518 adds the non-licensed information item as a training example to the second subset of training examples in the data store 1520. That is, the training example includes the non-licensed information item, together with the same label assigned to its licensed information item counterpart.

In some cases, a licensed information item corresponds to a licensed version of the information delivered by the original publisher of the information item, or the publisher which is otherwise considered to be an authoritative provider of the information item. A non-licensed information item is often an unlicensed copy of the licensed information item, published by another publisher. The licensed item and the non-licensed information items will have different URL information, and possibly other variations (including different taglines, captions, etc.). It is useful to include a non-licensed item in the training examples because it expands the scope of features available for analysis for a particular information item.

In some implementations, the item-comparing component 1602 performs its matching analysis based on URL information and/or title information associated with any given pair of information items. The item-comparing component 1602 can apply any standard of comparison, such as exact match, approximate match, etc. In some implementations, the item-comparing component 1602 assesses an extent to which two items are similar by determining the cosine similarity distance between the two items (expressed as two respective vectors), and then comparing the distance with respect to an environment-specific threshold value.

Figure 17:
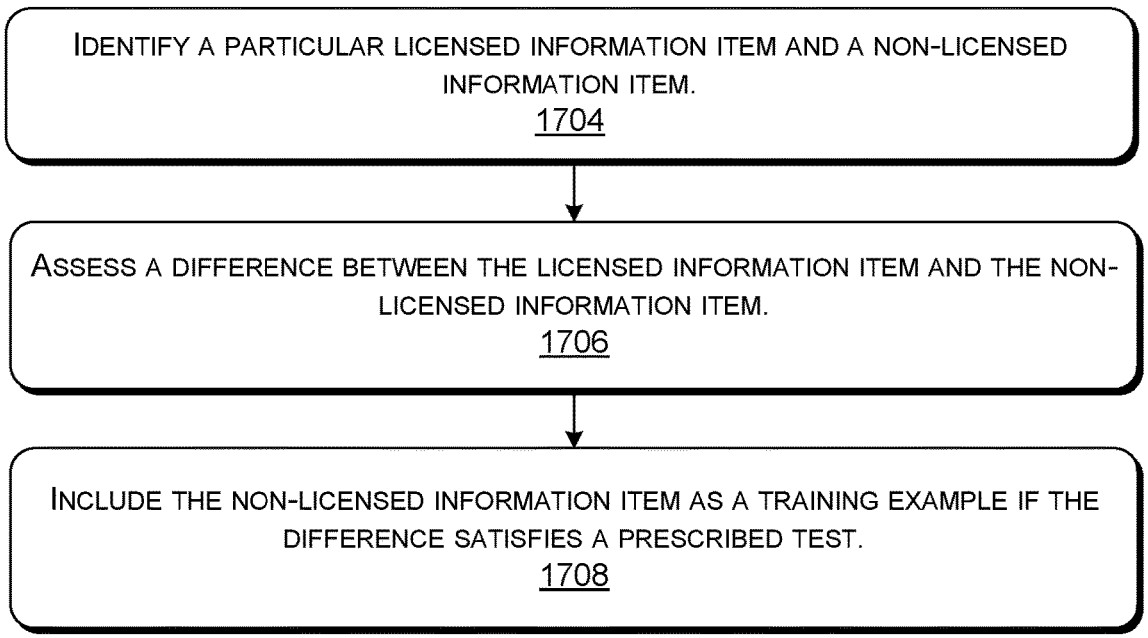
FIG. 17 shows a process that describes one manner of operation of the first example-mining subsystem of FIG. 16.

FIG. 17 shows a process 1702 that describes one manner of operation of the first example-mining subsystem 1518 of FIG. 16. In block 1704, the first example-mining subsystem 1518 identifies a particular licensed information item and a non-licensed information item. In block 1706, the first example-mining subsystem 1518 assesses a difference between the licensed information item and the non-licensed information item. In block 1708, the first example-mining subsystem 1518 includes the non-licensed information item as a training example if the difference satisfies a prescribed test.

FIG. 18 shows one implementation of the second example-mining subsystem 1522. An item-collecting component 1802 identifies a set of information items published by a particular publisher in a prescribed timeframe. The item-collecting component 1802 also collects click information that identifies how frequently users engage with the information items at different locations-of-interest, such as different cities. The item-collecting component 1802 stores the above-described information in a data store 1804.

A distribution-generating component 1806 identifies a distribution 1808 based on the information in the data store 1804. Each entry in the distribution 1808 identifies a frequency-of-engagement of the publisher's information items at a particular location (e.g., in a particular city). In some implementations, the distribution-generating component 1806 omits any location having a level engagement below a prescribed environment specific threshold value, such as 50 clicks.

A filtering component 1810 performs gap-ratio analysis to remove entries from the distribution 1808 that have comparatively low engagement. To perform this task, the filtering component 1810 identifies the location in the distribution 1808 having the greatest engagement, F_Max. Assume that the entry 1812 correspond to a location (e.g., a particular city) having the highest engagement. The filtering component 1810 measures the gap ratio for any other entry by: subtracting the level of engagement (F_o) of this other entry by the maximum engagement (F_Max), and dividing the difference by the maximum engagement (F_Max). The filtering component 810 retains an entry under consideration if the gap ratio for this entry is below a prescribed threshold value, such as 0.25; otherwise the filtering component 1810 removes the entry. Assume that the filtering component 1810 removes the entry 1814 associated with a particular city because it satisfies the above removal test.

An item-labeling component 1816 classifies the publisher based on the modified distribution produced by the filtering component 1810. In one implementation, the item-labeling component 1816 classifies the publisher as a strongly-local publisher if the number of remaining locations in the distribution 1808 in the same state (or other region of interest, such as a province) is less than 10. For example, KOMO-TV Seattle (a publisher of news in the Seattle region) is a strongly-local publisher with an affinity to the cities in King County, in Washington State. The item-labeling component 1816 classifies the publisher as a strongly-non-local publisher if the remaining locations in the distribution 1808 are in two or more states (or other regions of interest, such as provinces). For instance, FOX News is a national news agency in the United States having an affinity to various cities across different states (e.g., California, New York, and Michigan). Therefore, FOX News is a strongly-non-local publisher. The item-labeling component 1816 classifies other publishers as "ambiguous," e.g., because they publish information items of both national and local interest. The Associated Press is an example of a publisher that falls into this category. The specific threshold values set forth above are illustrative; other implementations can vary these threshold values based on any environment-specific considerations.

Based on the above analysis, the item-labeling component 1816 labels information items published by strongly local publishers as local information items. The item-labeling component 1816 labels information items published by strongly non-local publishers as non-local information items. The item-labeling component 1816 appends no labels to the information items of ambiguous publishers, and these information items do not contribute to training examples produced by the second example-mining technique 1522.

FIG. 19 shows a process 1902 that describes one manner of operation of the second example-mining subsystem 1522 of FIG. 18. In block 1904, the second example-mining subsystem 1522 collects information regarding information items published by a particular publisher within a prescribed timeframe, and information regarding engagement by users with the information items published by the particular publisher. In block 1906, the second example-mining subsystem 1522 generates a distribution 1808 based on the information that is collected. As described above, the distribution 1808 expresses a frequency at which information items are selected with respect to different locations-of-interest (e.g., cities). In block 1908, the second example-mining subsystem 1522 identifies and removes a particular location-of-interest from the distribution upon determining that the particular location-of-interest has a frequency-of-selection (F_o) that is less than a location-of-interest having a maximum frequency-of-selection (F_Max) in the distribution 1808, by a prescribed normalized amount. In practice, the second example-mining subsystem 1522 can remove zero, one, or more locations-of-interest in block 1908.

In block 1910, based on an outcome of block 1902, the second example-mining subsystem 1522 classifies an extent to which the particular publisher is a local publisher or a non-local publisher. Further, for a publisher that is identified as a local publisher, the second example-mining subsystem 1522 marks information items published by this local publisher as local information items. The second example-mining subsystem 1522 can do the same with respect to the information items of an identified non-local publisher.

FIG. 20 shows one implementation of the third example-mining subsystem 1526 that uses a bootstrapping approach to expand a number of training examples. The third example-mining subsystem 1526 uses a translation engine 2002 to map non-native training examples (e.g., non-English examples) in a data store 2004 to a set of converted native-language examples (e.g., English examples), which are stored in a data store 2006. The localness-determining system 104 determines whether the converted native-language examples in the data store 2006 include local content. The localness-determining system 104 is trained by the training system 112 based a corpus of native-language examples (e.g., English language documents) in a data store 2008.

A post-processing system 2010 adds the converted native-language examples in the data store 2006 as new training examples, subject to environment-specific revisions. For example, assume that a non-native information item is originally marked as local. But assume that, after converting the non-native information item to a native-language information item, the localness-determining system 104 determines that the converted non-language information item is non-local. The opposite scenario may also occur, in which a non-native information item is originally marked as non-local, but the localness-determining system 104 concludes that its translated counterpart is local. In either case, the post-processing system 210 accepts the classification of the localness-determining system 104 if the confidence of the prediction satisfies an environment-specific threshold level. The post-processing system 210 also accepts the label of the localness-determining system 104 if the original non-native language example has no original label.

In some implementations, the translation engine 2002 uses a decoder that is implemented using the transformer architecture shown in FIG. 5. Here, the translation engine 2002 operates autoregressively; after the translation engine 2002 predicts a text token, it adds the predicted text token to the end of a previous sequence of input tokens, to produce an updated sequence of input tokens. In a next pass, the translation engine 2002 predicts a next token based on the updated sequence of tokens. Background information on the general topic of transformer-based decoders can be found in Brown, et al., "Language Models are Few-Shot Learners," arXiv, Cornell University, arXiv:2005.14165v4 [cs.CL], Jul. 22, 2020, 75 pages.

FIG. 21 shows a process 2102 that describes one manner of operation of the third example-mining subsystem 1526 of FIG. 20. In block 2104, the third example-mining subsystem 1526 translates a particular information item from a first natural language to a second natural language, to provide a converted information item. In block 2106, the third example-mining subsystem 1526 determines, using the localness-determining system 104, whether the converted information item contains local content. The localness-determining system 104 is trained based on training examples expressed in the second natural language. In block 2108, the third example-mining subsystem 1526 produces a training example based on the converted information item.

FIG. 22 shows one implementation of the fourth example-mining subsystem 1530. The fourth example-mining subsystem 1530 uses one more translation engines 2202 to translate non-native-language examples (e.g., non-English examples) in a first data store 2204 to a native language (e.g., English), to produce converted native-language examples, which it stores in a second data store 2206. The fourth example-mining subsystem 1530 then uses the translation engine(s) 2202 to translate the converted native-language examples in the data store 2206 into restored non-native-language examples, which it stores in the data store 2208.

Alternatively, or in addition, the fourth example-mining subsystem 1530 uses the translation engine(s) 2202 to convert native-language examples in a data store 2210 to a non-native language, to produce corresponding converted non-native-language examples, which it stores in the data store 2212. A label assigned to a native-language example carries over to its translated counterpart example. The fourth example-mining subsystem 1530 helps maintain the precision of the classifier model 414 trained on native-language examples.

The fourth example-mining system 1530 can produce examples based on any of the versions of the examples. A label assigned to any version of an example (which is produced in any manner described herein) carries over to its translated counterparts. In general, the chain of translations produced by the fourth example-mining system 1530 expands the words that are used to describe the same concepts, and thus improves training.

FIG. 23 shows a process 2302 that describes one manner of operation of the fourth example-mining subsystem 1530 of FIG. 22. In block 2304, the third example-mining subsystem 1526 translates a first particular information item from a first natural language to a second natural language, to produce a converted information item, and then translates the converted information item from the second natural language to the first natural language, to provide a restored information item. The third example-mining subsystem 1526 produces a first training example based on the restored information item. In block 2306, the third example-mining subsystem 1526 translates a second particular information item from the second natural language to the first natural language to produce a translated information item. The third example-mining subsystem 1526 produces a second training example based on the translated information item.

In general, the task of generating a multi-lingual classifier model 1512 is a challenging problem because a developer may lack a sufficient number of original training examples expressed in one or more non-English languages. The functionality described with respect to FIGS. 20-22, together with the use of the multi-lingual pre-training system 1502, allows the training system 112 to overcome or lessen these challenges. Through these provisions, the computing system 102 avoids the use of separately-trained classification models for different natural languages, which is an inefficient solution from both the standpoint of development and use.

Although not shown in the drawings, a fifth example-mining technique relies on the publishers to mark information items as local or non-local. This subset of training examples, however, may be small compared to other subsets of training examples, and may suffer from a higher amount of noise compared to other subsets of training examples.

E. Summary

Figure 24:
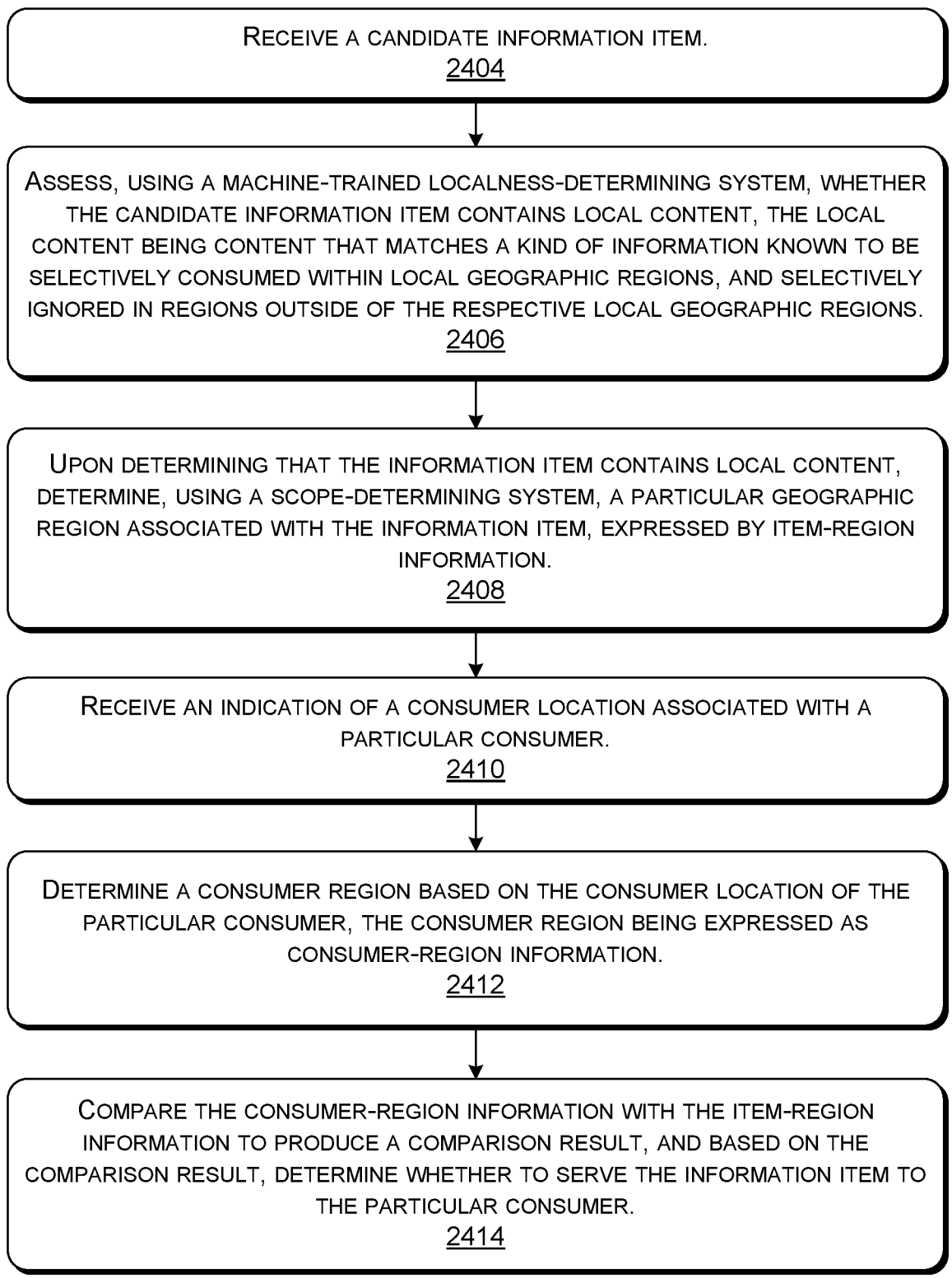
FIG. 24 shows a process that describes an overview of one manner of operation of the computing system of FIG. 1.

FIG. 24 shows a process 2402 for selecting and serving local information items. In block 2404, the computing system 102 receives a candidate information item. In block 2406, the computing system 102 assesses, using the machine-trained localness-determining system 104, whether the candidate information item contains local content. Local content is content that matches a kind of information known to be selectively consumed within local geographic regions, and selectively ignored in regions outside of the respective local geographic regions. In block 2408, upon determining that the information item contains local content, the computing system 102 determines, using the scope-determining system 106, a particular geographic region associated with the information item, expressed by item-region information. In block 2410, the computing system 102 receives an indication of a consumer location associated with a particular consumer. In block 2412, the computing system 102 determines a consumer region based on the consumer location of the particular consumer, the consumer region being expressed as consumer-region information. In block 2414, the computing system 102 compares the consumer-region information with the item-region information to produce a comparison result, and based on the comparison result, determines whether to serve the information item to the particular consumer.

F. Representative Computing Functionality

FIG. 25 shows a computing system 2502 that, in some implementations, is used to implement any aspect of the mechanisms set forth in the above-described figures. For instance, in some implementations, the type of computing system 2502 shown in FIG. 25 is used to implement any local computing device or any server shown in FIG. 3. In all cases, the computing system 2502 represents a physical and tangible processing mechanism.

The computing system 2502 includes a processing system 2504 including one or more processors. The processor(s) include one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any processor corresponds to a general-purpose processing unit or an application-specific processor unit.

The computing system 2502 also includes computer-readable storage media 2506, corresponding to one or more computer-readable media hardware units. The computer-readable storage media 2506 retains any kind of information 2508, such as machine-readable instructions, settings, model weights, and/or other data. In some implementations, the computer-readable storage media 2506 includes one or more solid-state devices, one or more magnetic hard disks, one or more optical disks, magnetic tape, etc. Any instance of the computer-readable storage media 2506 uses any technology for storing and retrieving information. Further, any instance of the computer-readable storage media 2506 represents a fixed or removable unit of the computing system 2502. Further, any instance of the computer-readable storage media 2506 provides volatile and/or non-volatile retention of information.

More generally, any of the storage resources described herein, or any combination of the storage resources, is to be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media; a computer-readable storage medium or storage device is "non-transitory" in this regard.

The computing system 2502 utilizes any instance of the computer-readable storage media 2506 in different ways. For example, in some implementations, any instance of the computer-readable storage media 2506 represents a hardware memory unit (such as random access memory (RAM)) for storing information during execution of a program by the computing system 2502, and/or a hardware storage unit (such as a hard disk) for retaining/archiving information on a more permanent basis. In the latter case, the computing system 2502 also includes one or more drive mechanisms 2510 (such as a hard drive mechanism) for storing and retrieving information from an instance of the computer-readable storage media 2506.

In some implementations, the computing system 2502 performs any of the functions described above when the processing system 2504 executes computer-readable instructions stored in any instance of the computer-readable storage media 2506. For instance, in some implementations, the computing system 2502 carries out computer-readable instructions to perform each block of the processes described in with reference to any of the flowcharts described herein. FIG. 25 generally indicates that hardware logic circuitry 2512 includes any combination of the processing system 2504 and the computer-readable storage media 2506.

In addition, or alternatively, the processing system 2504 includes one or more other configurable logic units that perform operations using a collection of logic gates. For instance, in some implementations, the processing system 2504 includes a fixed configuration of hardware logic gates, e.g., that are created and set at the time of manufacture, and thereafter unalterable. In addition, or alternatively, the processing system 2504 includes a collection of programmable hardware logic gates that are set to perform different application-specific tasks. The latter category of devices includes Programmable Array Logic Devices (PALs), Generic Array Logic Devices (GALs), Complex Programmable Logic Devices (CPLDs), Field-Programmable Gate Arrays (FPGAs), etc. In these implementations, the processing system 2504 effectively incorporates a storage device that stores computer-readable instructions, insofar as the configurable logic units are configured to execute the instructions and therefore embody or store these instructions.

In some cases (e.g., in the case in which the computing system 2502 represents a user computing device), the computing system 2502 also includes an input/output interface 2514 for receiving various inputs (via input devices 2516), and for providing various outputs (via output devices 2518). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 2520 and an associated graphical user interface presentation (GUI) 2522. The display device 2520 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 2502 also includes one or more network interfaces 2524 for exchanging data with other devices via one or more communication conduits 2526. One or more communication buses 2528 communicatively couple the above-described units together.

The communication conduit(s) 2526 can be implemented in any manner, e.g., by a local area computer network, a wide area computer network (e.g., the Internet), point-to-point connections, or any combination thereof. The communication conduit(s) 2526 include any combination of hardwired links, wireless links, routers, gateway functionality, name servers, etc., governed by any protocol or combination of protocols.

FIG. 25 shows the computing system 2502 as being composed of a discrete collection of separate units. In some cases, the collection of units corresponds to discrete hardware units provided in a computing device chassis having any form factor. FIG. 25 shows illustrative form factors in its bottom portion. In other cases, the computing system 2502 includes a hardware logic unit that integrates the functions of two or more of the units shown in FIG. 1. For instance, in some implementations, the computing system 2502 includes a system on a chip (SoC or SOC), corresponding to an integrated circuit that combines the functions of two or more of the units shown in FIG. 25.

The following summary provides a set of illustrative examples of the technology set forth herein.

(A1) According to a first aspect, a computer-implemented method (e.g., 2402) is described for selecting and serving local information items. The method includes: receiving (e.g., in block 2404) a candidate information item, and assessing (e.g., in block 2406), using a machine-trained localness-determining system (e.g., 104), whether the candidate information item contains local content. The local content is content that matches a kind of information known to be selectively consumed within local geographic regions, and selectively ignored in regions outside of the respective local geographic regions. The method further includes: upon determining that the information item contains local content, determining (e.g., in block 2408), using a scope-determining system (e.g., 106), a particular geographic region associated with the information item, expressed by item-region information; receiving (e.g., in block 2410) an indication of a consumer location associated with a particular consumer; determining (e.g., in block 2412) a consumer region based on the consumer location of the particular consumer, the consumer region being expressed as consumer-region information; and comparing (e.g., in block 2414) the consumer-region information with the item-region information to produce a comparison result, and based on the comparison result, determining whether to serve the information item to the particular consumer.

(A2) According to some implementations of the method of A1, the localness-determining system performs the assessing by: extracting feature information from the candidate information item using a set of feature-extracting processes; and mapping the feature information to a binary result that indicates whether the candidate item information contains local content.

(A3) According to some implementations of the methods of A1 or A2, the localness-determining system uses a transformer-based classifier model.

(A4) According to some implementations of any individual method of the methods of A1-A3, the item-region information uses a set of geohashes to describe the item region, and the consumer-region information uses at least one geohash to describe the consumer region.

(A5) According to some implementations of any individual method of the methods of A1-A4, the scope-determining system operates by: using plural region-identifying processes to identify a set of candidate regions; and selecting from among the set of candidate regions, to produce a final set of regions that collectively make up the particular geographic region.

(A6) According to some implementations of the method of A5, one region-identifying process involves: identifying geographic name information in the candidate information item; and consulting a lookup table to determine a subset of candidate regions associated with the geographic name information.

(A7) According to some implementations of any the methods of A5 or A6, one region-identifying process involves: formulating query information based on the information item; submitting the query information to a map system; receiving boundary information from the map system in response to the query information; and identifying a subset of regions associated with the boundary information.

(A8) According to some implementations of any individual method of the methods of A5-A7, one region-identifying process involves: collecting a set of information items associated with a particular publisher of the candidate information item; interacting with a reference system to determine a first subset of candidate regions associated with the particular publisher; generating a distribution of candidate regions in the first subset of candidate region, the distribution expressing a frequency at which each candidate region in the first subset of candidate regions appears in the first subset of candidate regions; and based on the distribution, identifying and removing a particular region from the first subset of candidate regions that satisfies a prescribed test for removal, to produce a final subset of regions.

(A9) According to some implementations of the method of A8, the prescribed test involves determining whether the particular region has a frequency-of-occurrence in the distribution that is lower than a maximum frequency-of-occurrence in the distribution, by a prescribed normalized amount.

(A10) According to some implementations of any individual method of the methods of A1-A9, the computer-implemented method further comprises: receiving a first value that represents a location of the particular geographic region identified by the scope-determining system, and a second value that represents the location of the consumer; and assessing a difference between the first value and the second value, the difference being zero when the location of the consumer is within the particular geographic region.

(A11) According to some implementations of any individual method of the methods of A1-A10, the method further comprises generating output information for presentation to the consumer that identifies the candidate information item and/or that identifies information extracted from the candidate information item.

(A12) According to some implementations of any individual method of the methods of A1-A11, the localness-determining system is produced by a training system based on a set of training examples, wherein the training examples are produced by plural example-mining processes.

(A13) According to some implementations of the method of claim 12, one example-mining process includes: identifying a particular licensed information item and a non-licensed information item; assessing a difference between the licensed information item and the non-licensed information item; and including the non-licensed information item as a training example if the difference satisfies a prescribed test.

(A14) According to some implementations of the methods of A12 or A13, one example-mining processing includes: collecting information regarding information items published by a particular publisher within a prescribed timeframe, and information regarding engagement by users with the information items published by the particular publisher; generating a distribution based on the information that is collected, the distribution expressing a frequency at which information items are selected with respect to different locations-of-interest; identifying and removing a particular location-of-interest from the distribution upon determining that the particular location-of-interest has a frequency-of-selection that is less than a maximum frequency-of-selection associated with another location-of-interest in the distribution, by a prescribed normalized amount; and based on an outcome of the identifying and removing, classifying an extent to which the particular publisher is a local publisher, and, for a publisher that is identified as a local publisher, labeling information items published by the local publisher as local information items.

(A15) According to some implementations of any individual method of the methods of A12-A14, one example-mining process involves: translating a particular information item from a first natural language to a second natural language, to provide a converted information item; determining, using the localness-determining system, whether the converted information item contains local content, the localness-determining system being trained based on training examples expressed in the second natural language; and producing a training example based the converted information item.

(A16) According to some implementations of any individual method of the methods of A12-A15, one example-mining process involves: translating a first particular information item from a first natural language to a second natural language, to produce a converted information item, and then translating the converted information item from the second natural language to the first natural language, to provide a restored information item; producing a first training example based on the restored information item; translating a second particular information item from the second natural language to the first natural language to produce a translated information item; and producing a second training example based on the translated information item.

In yet another aspect, some implementations of the technology described herein include a computing system (e.g., the computing system 2502) that includes a processing system (e.g., the processing system 2504) having a processor. The computing system also includes a storage device (e.g., the computer-readable storage media 2506) for storing computer-readable instructions (e.g., information 2508). The processing system executes the computer-readable instructions to perform any of the methods described herein (e.g., any individual method of the methods of A1-A16).

In yet another aspect, some implementations of the technology described herein include a computer-readable storage medium (e.g., the computer-readable storage media 2506) for storing computer-readable instructions (e.g., the information 2508). A processing system (e.g., the processing system 2504) executes the computer-readable instructions to perform any of the operations described herein (e.g., the operation in any individual method of the methods of A1-A16).

More generally stated, any of the individual elements and steps described herein are combinable into any logically consistent permutation or subset. Further, any such combination is capable of being be manifested as a method, device, system, computer-readable storage medium, data structure, article of manufacture, graphical user interface presentation, etc. The technology is also expressible as a series of means-plus-format elements in the claims, although this format should not be considered to be invoked unless the phrase "means for" is explicitly used in the claims.

As to terminology used in this description, the phrase "configured to" encompasses various physical and tangible mechanisms for performing an identified operation. The mechanisms are configurable to perform an operation using the hardware logic circuitry 2512 of FIG. 25. The term "logic" likewise encompasses various physical and tangible mechanisms for performing a task. For instance, each processing-related operation illustrated in the flowcharts described herein corresponds to a logic component for performing that operation.

This description may have identified one or more features as optional. This type of statement is not to be interpreted as an exhaustive indication of features that are to be considered optional; generally, any feature is to be considered as optional, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

In terms of specific terminology, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of" or the like, is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. The phrase "any combination thereof" refers to any combination of two or more elements in a list of elements. Further, the terms "comprising," "including," and "having" are open-ended terms that are used to identify at least one part of a larger whole, but not necessarily all parts of the whole. A "set" includes zero members, one member, or more than one member. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for selecting and serving local information items in two stages, comprising:
   receiving a candidate information item;
   in a first stage of the two stages, assessing, using a machine-trained localness-determining system, whether the candidate information item contains local content, the local content being content that matches a kind of information known to be selectively consumed within local geographic regions, and selectively ignored in regions outside of the respective local geographic regions, wherein the localness-determining system performs the assessing by: extracting feature information from the candidate information item using a set of feature-extracting processes; and mapping the feature information to a binary result that indicates whether the candidate item information contains local content without resolving a particular location and bounds associated with the candidate information item;
   in a second stage of the two stages, upon determining that the information item contains local content, determining, using a scope-determining system, a particular geographic region associated with the information item, expressed by item-region information;
   receiving an indication of a consumer location associated with a particular consumer;
   determining a consumer region based on the consumer location of the particular consumer, the consumer region being expressed as consumer-region information; and
   comparing the consumer-region information with the item-region information to produce a comparison result, and based on the comparison result, determining whether to serve the information item to the particular consumer.

2. The computer-implemented method of claim 1, wherein the localness-determining system uses a transformer-based classifier model.

3. The computer-implemented method of claim 1, wherein the item-region information uses a set of geohashes to describe the item region, and wherein the consumer-region information uses at least one geohash to describe the consumer region, each geohash being created by a geohash encoding technique, the geohash encoding technique being a curve-filling technique that provides a way of encoding map blocks of prescribed size and location using respective alphanumeric codes.

4. The computer-implemented method of claim 1, wherein the scope-determining system operates by:
   using plural region-identifying processes to identify a set of candidate regions; and
   selecting from among the set of candidate regions, to produce a final set of regions that collectively make up the particular geographic region.

5. The computer-implemented method of claim 4, wherein one region-identifying process involves:
   identifying geographic name information in the candidate information item; and
   consulting a lookup table to determine a subset of candidate regions associated with the geographic name information.

6. The computer-implemented method of claim 4, wherein one region-identifying process involves:
   formulating query information based on the candidate information item;
   submitting the query information to a map system;
   receiving boundary information from the map system in response to the query information; and
   identifying a subset of regions associated with the boundary information.

7. The computer-implemented method of claim 4, wherein one region-identifying process involves:
   collecting a set of information items associated with a particular publisher of the candidate information item;
   interacting with a reference system to determine a first subset of candidate regions associated with the particular publisher;
   generating a distribution of candidate regions in the first subset of candidate region, the distribution expressing a frequency at which each candidate region in the first subset of candidate regions appears in the first subset of candidate regions; and
   based on the distribution, identifying and removing a particular region from the first subset of candidate regions that satisfies a prescribed test for removal, to produce a final subset of regions.

8. The computer-implemented method of claim 7, wherein the prescribed test involves determining whether the particular region has a frequency-of-occurrence in the distribution that is lower than a maximum frequency-of-occurrence in the distribution, by a prescribed normalized amount.

9. The computer-implemented method of claim 1, wherein the computer-implemented method further comprises:
   receiving a first value that represents a location of the particular geographic region identified by the scope-determining system, and a second value that represents the location of the consumer; and
   assessing a difference between the first value and the second value, the difference being zero when the location of the consumer is within the particular geographic region.

10. The computer-implemented method of claim 1, wherein the method further comprises generating output information for presentation to the consumer that identifies the candidate information item and/or that identifies information extracted from the candidate information item.

11. The computer-implemented method of claim 1, wherein the localness-determining system is produced by a training system based on a set of training examples, wherein the training examples are produced by plural example-mining processes.

12. The computer-implemented method of claim 11, wherein one example-mining process includes:

identifying a particular licensed information item and a non-licensed information item;
assessing a difference between the licensed information item and the non-licensed information item; and
including the non-licensed information item as a training example if the difference satisfies a prescribed test.

13. The computer-implemented method of claim 11, wherein one example-mining processing includes:
collecting information regarding information items published by a particular publisher within a prescribed timeframe, and information regarding engagement by users with the information items published by the particular publisher;
generating a distribution based on the information that is collected, the distribution expressing a frequency at which information items are selected with respect to different locations-of-interest;
identifying and removing a particular location-of-interest from the distribution upon determining that the particular location-of-interest has a frequency-of-selection that is less than a maximum frequency-of-selection associated with another location-of-interest in the distribution, by a prescribed normalized amount; and
based on an outcome of the identifying and removing, classifying an extent to which the particular publisher is a local publisher, and, for a publisher that is identified as a local publisher, labeling information items published by the local publisher as local information items.

14. The computer-implemented method of claim 11, wherein one example-mining process involves:
translating a particular information item from a first natural language to a second natural language, to provide a converted information item;
determining, using the localness-determining system, whether the converted information item contains local content, the localness-determining system being trained based on training examples expressed in the second natural language; and
producing a training example based the converted information item.

15. The computer-implemented method of claim 11, wherein one example-mining process involves:
translating a first particular information item from a first natural language to a second natural language, to produce a converted information item, and then translating the converted information item from the second natural language to the first natural language, to provide a restored information item;
producing a first training example based on the restored information item;
translating a second particular information item from the second natural language to the first natural language to produce a translated information item; and
producing a second training example based on the translated information item.

16. The computer-implemented method of claim 1, wherein the assessing relies on machine-trained weights produced by a training system based on a set of training examples, wherein the training examples are produced by plural example-mining processes, wherein each training example includes a particular information item and provides a label that indicates whether the information item is local or non-local.

17. A computing system for selecting and serving information items in two stages, comprising;
a store for storing computer-readable instructions;
a processing system for executing the computer-readable instructions to perform operations that include:
receiving a candidate information item;
in a first stage of the two stages, providing, using a machine-trained localness-determining system, a binary result that indicates whether the candidate information item contains local content without resolving a particular location and bounds associated with the candidate information item, the local content being content that matches a kind of information known to be selectively consumed within local geographic regions, and selectively ignored in regions outside of the respective local geographic regions;
in a second stage of the two stages, upon determining that the information item contains local content, determining, using a scope-determining system, a particular geographic region associated with the information item, expressed by item-region information using a set of item geohashes, each geohash being created by a geohash-encoding technique, the geohash encoding technique being a curve-filling technique that provides a way of encoding map blocks of prescribed size and location using respective alphanumeric codes;
receiving an indication of a location associated with a particular consumer;
determining a consumer region based on the location of the particular consumer, the consumer region being expressed as consumer-region information using at least one consumer geohash; and
comparing the consumer-region information with the item-region information to produce a comparison result, and based on the comparison result, determining whether to serve the information item to the particular consumer.

18. The computing system of claim 17, wherein the scope-determining system operates by:
using plural region-identifying processes to identify a set of candidate regions; and
selecting from among the set of candidate regions, to produce a final set of regions that collectively make up the particular geographic region.

19. The computing system of claim 17, wherein the localness-determining system is produced by a training system based on a set of training examples, wherein the training examples are produced by plural example-mining processes.

20. A computer-readable storage medium for storing computer-readable instructions, the computer-readable storage medium excluding propagated signals per se in transit, a processing system executing the computer-readable instructions to perform operations, the operations comprising:
receiving a candidate information item;
assessing, in a first stage of two stages, whether the candidate information item contains local content without resolving a particular location and bounds associated with the candidate information item, the local content being content that matches a kind of information known to be selectively consumed within local geographic regions, and selectively ignored in regions outside of the respective local geographic regions,
the assessing relying on machine-trained weights produced by a training system based on a set of training examples, wherein the training examples are produced by plural example-mining processes, wherein each training example includes a particular information item and provides a label that indicates whether the information item is local or non-local; and in a second stage of the two stages, upon determining that the information item contains local content, determining, using plural region-identifying processes, a particular geographic region associated with the information item, expressed by item-region information, receiving an indication of a location associated with a particular consumer;

determining a consumer region based on the location of the particular consumer, the consumer region being expressed as consumer-region information; and comparing the consumer-region information with the item-region information to produce a comparison result, and based on the comparison result, determining whether to serve the information item to the particular consumer.

\* \* \* \* \*